US012688827B2

(12) United States Patent
Zhang

(10) Patent No.: US 12,688,827 B2
(45) Date of Patent: Jul. 21, 2026

(54) DISPLAY PANEL AND DISPLAY DEVICE

(71) Applicants: Wuhan Tianma Micro-Electronics Co., Ltd., Wuhan (CN); Wuhan Tianma Micro-Electronics Co., Ltd. Shanghai Branch, Shanghai (CN)

(72) Inventor: Mengmeng Zhang, Shanghai (CN)

(73) Assignees: Wuhan Tianma Micro-Electronics Co., Ltd., Wuhan (CN); Wuhan Tianma Micro-Electronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 18/952,647

(22) Filed: Nov. 19, 2024

(65) Prior Publication Data

US 2026/0065857 A1 Mar. 5, 2026

(30) Foreign Application Priority Data

Aug. 29, 2024 (CN) ........................ 202411207014.0

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2310/08* (2013.01); *G09G 2320/0233* (2013.01)

(58) Field of Classification Search
CPC .................................................... G09G 3/3233
USPC .......................................................... 345/691
See application file for complete search history.

(56) References Cited

U.S. PATENT DOCUMENTS 11,749,178 B2 * 9/2023 An ........................... G09G 3/32 345/214
2012/0306843 A1 * 12/2012 Wang ................... G09G 3/3258 345/212
2016/0133191 A1 * 5/2016 Kang ................... G09G 3/3258 345/212
2018/0151124 A1 * 5/2018 An ....................... G09G 3/3225
2022/0019331 A1 * 1/2022 Park ........................ G06F 3/044
2023/0267882 A1 * 8/2023 Yang .................... G09G 3/3233
2024/0144856 A1 * 5/2024 Kim ..................... G09G 3/2096

FOREIGN PATENT DOCUMENTS

CN 114299865 A 4/2022
CN 115359759 A 11/2022
CN 115911056 A 4/2023

* cited by examiner

*Primary Examiner* — Calvin C Ma
(74) *Attorney, Agent, or Firm* — Anova Law Group, PLLC

(57) ABSTRACT

A display panel includes pixels arranged in an array, data lines, and first scan lines. At least a portion of pixels in a same row is electrically connected to a same first scan line. At least a portion of pixels in a same column is electrically connected to a same data line. The pixels at least include first pixels whose luminous color is a first color. A driving cycle of a pixel includes a pre-writing stage, where a data signal of the pixel is written to a data line electrically connected to the pixel; and a data writing stage, where a data signal on the data line electrically connected to the pixel is written to the pixel. At least in the data writing stage of the pixel, the first scan line electrically connected to the pixel transmits an enable level of the first scan signal.

20 Claims, 30 Drawing Sheets

DISPLAY PANEL AND DISPLAY DEVICE

CROSS-REFERENCE TO RELATED APPLICATION

This application claims the priority of Chinese Patent Application No. 202411207014.0, filed on Aug. 29, 2024, the content of which is incorporated herein by reference in its entirety.

TECHNICAL FIELD

The present disclosure generally relates to the field of display technology and, more particularly, relates to a display panel and a display device.

BACKGROUND

A display panel is usually provided with a plurality of pixels arranged in an array. By scanning each row of pixels row by row, data signals are correspondingly written into each pixel one by one, such that each pixel can display and emit light according to written data signals and the display panel can realize color display.

However, because of the influence of signal terminals in data driving circuits of the display panel, the time of providing the data signals to each pixel in one same row is different, resulting in the difference of the data signals written to each pixel in the same row, such that there is a difference between the display luminous brightness of each pixel in the same row. Therefore, the display panel appears vertical stripes, which affects the display effect of the display panel.

SUMMARY

One aspect of the present disclosure provides a display panel. The display panel includes a plurality of pixels arranged in an array, a plurality of data lines, and a plurality of first scan lines. At least a portion of pixels of the plurality of pixels in a same row is electrically connected to a same first scan line of the plurality of first scan lines. At least a portion of pixels of the plurality of pixels in a same column is electrically connected to a same data line of the plurality of data lines. The plurality of pixels at least includes first pixels whose luminous color is a first color. A driving cycle of a pixel of the plurality of pixels includes a pre-writing stage and a data writing stage. In the pre-writing stage of the pixel, a data signal of the pixel is controlled to be written to a data line electrically connected to the pixel. In the data writing stage of the pixel, a data signal on the data line electrically connected to the pixel is controlled to be written to the pixel. At least in the data writing stage of the pixel, the first scan line electrically connected to the pixel transmits an enable level of the first scan signal. A display mode of the display panel includes a first mode. In the first mode, there is at least one first scan line whose enable level time covers the pre-writing stage of each of the first pixels in at least part of the pixel rows, or the non-enable level time of the first scan signal transmitted by each of the first scan lines covers the pre-writing stage of each of the first pixels in at least part of the pixel rows.

Another aspect of the present disclosure provides a display device. The display device includes a display panel. The display panel includes a plurality of pixels arranged in an array, a plurality of data lines, and a plurality of first scan lines. At least a portion of pixels of the plurality of pixels in a same row is electrically connected to a same first scan line of the plurality of first scan lines. At least a portion of pixels of the plurality of pixels in a same column is electrically connected to a same data line of the plurality of data lines. The plurality of pixels at least includes first pixels whose luminous color is a first color. A driving cycle of a pixel of the plurality of pixels includes a pre-writing stage and a data writing stage. In the pre-writing stage of the pixel, a data signal of the pixel is controlled to be written to a data line electrically connected to the pixel. In the data writing stage of the pixel, a data signal on the data line electrically connected to the pixel is controlled to be written to the pixel. At least in the data writing stage of the pixel, the first scan line electrically connected to the pixel transmits an enable level of the first scan signal. A display mode of the display panel includes a first mode. In the first mode, there is at least one first scan line whose enable level time covers the pre-writing stage of each of the first pixels in at least part of the pixel rows, or the non-enable level time of the first scan signal transmitted by each of the first scan lines covers the pre-writing stage of each of the first pixels in at least part of the pixel rows.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
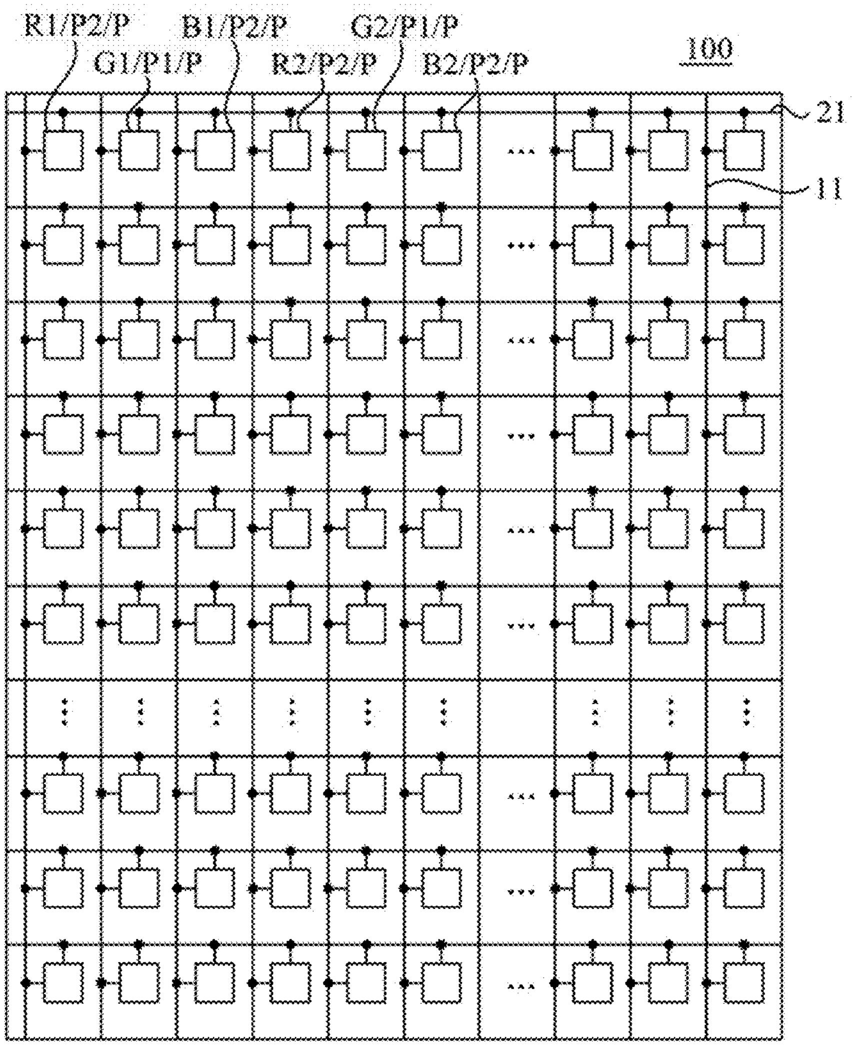
FIG. 1 illustrates an exemplary display panel consistent with various disclosed embodiments in the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted. Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the disclosure. Furthermore, a three-dimensional (3D) size including length, width, and depth should be considered during practical fabrication.

In the present disclosure, terms such as "center", "longitudinal", "lateral", "length", "width", "thickness", "up", "down", "front", "back", "left", "right", "vertical", "horizontal", "top", "bottom", "inside", "outside", "clockwise", "counterclockwise", "axial", "radial", "circumferential", etc., indicate orientations or positional relationships based on the orientations or positional relationships shown in the accompanying drawings, and are only for the convenience of describing the present disclosure and simplifying the description, and do not indicate or imply that the device or element referred to must have a specific orientation, be constructed and operated in a specific orientation, and therefore should not be understood as limiting the present disclosure.

In the present disclosure, relational terms such as first and second are only used to distinguish one entity or operation from another entity or operation, and do not necessarily require or imply any such actual relationship between these entities or operations or order. Moreover, the terms "including", "comprising" or any other variants thereof are intended to cover non-exclusive inclusion, such that a process, method, article, or device that includes a series of elements includes not only those elements, but also those that are not explicitly listed or also include elements inherent to this process, method, article or equipment. If there are no more restrictions, the elements defined by the sentence "including . . . " do not exclude the existence of other same elements in the process, method, article, or equipment that includes the elements.

It should be understood that when describing the structure of a component, when a layer or region is referred to as being "on" or "above" another layer or another region, the layer or region may be directly on the other layer or region, or indirectly on the other layer or region, for example, layers/components between the layer or region and another layer or another region. And, for example, when the component is reversed, the layer or region may be "below" or "under" the other layer or region. In the present disclosure, the term "electrical connection" refers to that two components are directly electrically connected with each other, or the two components are electrically connected via one or more other components.

In the present disclosure, unless otherwise clearly specified and limited, the terms "installed", "connected", "fixed" and the like appear, should be understood in a broad sense. For example, it can be a fixed connection, a detachable connection, or an integrated connection; it can be a mechanical connection or an electrical connection; it can be a direct connection or an indirect connection through an intermediate medium, it can be the internal connection of two elements or the interaction relationship between two elements, unless otherwise clearly defined. For those skilled in the art, the specific meanings of the above terms in the present disclosure can be understood according to the specific circumstances.

In the present disclosure, when an element is referred to as being "fixed to" or "disposed on" another element, it may be directly on the other element or there may be an intermediate element. When an element is considered to be "connected to" another element, it may be directly connected to the other element or there may be an intermediate element at the same time. If present, the terms "vertical", "horizontal", "upper", "lower", "left", "right" and similar expressions are for illustrative purposes only and are not intended to be the only embodiment.

The present disclosure provides a display panel. In one embodiment shown in FIG. 1, the display panel 100 may include a plurality of pixels P arranged in an array, a plurality of data lines 11, and a plurality of first scan lines 21. At least a portion of pixels P in a same row may be electrically connected to one same first scan line 21 of the plurality of first scan lines 21, and at least a portion of the pixels P in a same column may be electrically connected to one same data line 21 of the plurality of data lines.

For example, that at least a portion of the pixels P in the same row are electrically connected to the same first scan line 21, may be understood as, some or all of the pixels P in the same row are electrically connected to the same first scan line 21. Correspondingly, that at least a portion of the pixels P in the same column are electrically connected to the same data line 11, may be understood as, some or all of the pixels P in the same column are electrically connected to the same data line 11. The specific connection method between the first scan lines 21 and the data lines 11 and each pixel P may be designed according to actual needs, and the embodiments of the present disclosure do not specifically limit this.

Figure 2:
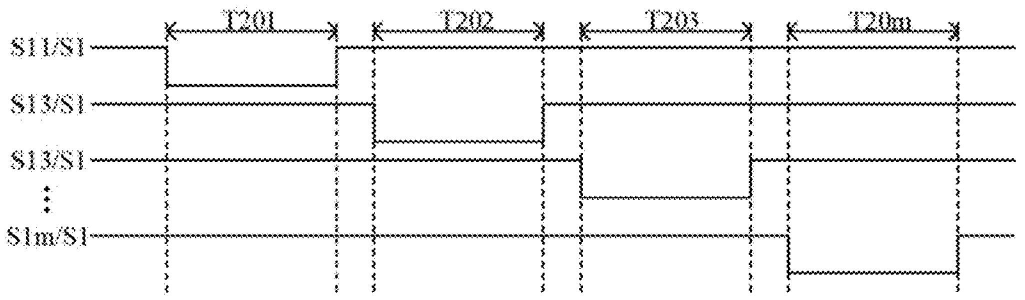
FIG. 2 illustrates a driving timing diagram of a display panel consistent with various disclosed embodiments in the present disclosure.

As shown in FIG. 1 and FIG. 2 which is a driving time diagram of a display panel, in one embodiment where the pixels P in one same row are electrical connected to one same first scan line 21 and the pixels P in one same column are electrically connected to one same data line 11, the plurality of first scan lines 21 may be used to transmit the first scan signals S1, and the enable level time of the first scan signal S1 transmitted by each first scan line 21 may be shifted sequentially. For example, the enable level time of the first scan signal S11 transmitted by the first scan line 21 electrically connected to the pixels P in the first row may be T201, the enable level time of the first scan signal S12 transmitted by the first scan line 21 electrically connected to the pixels P in the second row may be T202, the enable level time of the first scan signal S13 transmitted by the first scan line 21 electrically connected to the pixels P in the third row may be T203, . . . , and the enable level time of the first scan signal S1*m* transmitted by the first scan line 21 electrically connected to the pixel P in the m-th row may be T20*m*. In one embodiment, T201 may be before T202, T202 may be before T203, . . . , and T20*m* may be after T201, T202, T203, . . . . Correspondingly, a driving chip used to drive the display panel 100 for display may provide data signals for each row of pixels P to each data line 11 in a time-sharing manner, such that the data signals on the plurality of data lines 11 may be written into each pixel P one by one and each pixel P is able to display and emit light according to the data signal it receives.

In various embodiments of the present disclosure, the display panel 100 may be a self-luminous display panel (e.g., an organic light-emitting diode display panel) or a non-self-luminous display panel (e.g., a liquid crystal display panel). The specific type of the display panel 100 may be designed according to actual needs, and the embodiments of the present disclosure do not specifically limit this. Regardless of the type of the display panel 100, one pixel P may include a corresponding transistor which may be turned on or off under the control of one corresponding first scan signal S1. When the first scan signal S1 is at an enable level, the transistor may be controlled to be turned on, such that the data signal on the corresponding data line 11 electrically connected to the pixel P may be written to the corresponding node in the pixel P through the transistor. The type of the transistor receiving the first scan signal S1 in the pixel P may be N type or P type. For an N-type transistor, the enable level of the first scan signal S1 may be a high level, and the non-enable level of the first scan signal S1 may be a low level. For a P-type transistor, the enable level of the first scan signal S1 may be a low level, and the non-enable level of the first scan signal S1 may be a high level. On the premise that the core inventive point of the embodiments of the present disclosure is able to be realized, the embodiments of the present disclosure do not limit the specific type the transistor. For the convenience of description, without any special limitation, the transistor controlled by the first scan signal S1 as a P-type transistor will be used as an example to exemplarily illustrate the technical solutions of the embodiments of the present disclosure, and does not limit the scope of the present disclosure.

The time for providing the data signal of the pixel P to the data line 11 and the time for writing the data signal to the pixel P may overlap or not overlap. That is, the driving cycle of the pixel P may include a pre-writing stage and a data writing stage, and the time of the pre-writing stage and the data writing stage may overlap or not overlap. In the pre-writing stage of the pixel P, the data signal of the pixel P may be controlled to be written to the data line 11 electrically connected to the pixel P. In the data writing stage of the pixel P, the data signal on the data line 11 electrically connected to the pixel P may be controlled to be written to the pixel P. At least in the data writing stage of the pixel P, the first scan line 21 electrically connected to the pixel P may transmit the enable level of the first scan signal S1, and at this time, the enable level time of the first scan signal S1 may cover the data writing stage of pixel P.

Figure 3:
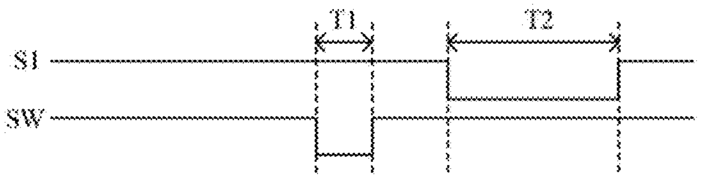
FIG. 3 illustrates a driving timing diagram of pixels in a display panel consistent with various disclosed embodiments in the present disclosure.
Figure 4:
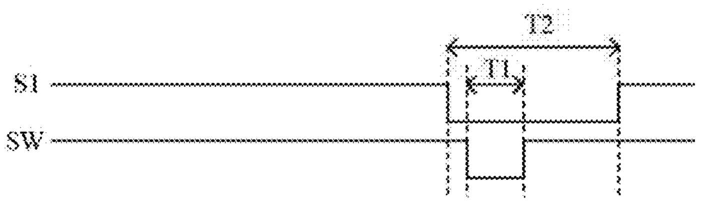
FIG. 4 illustrates a driving timing diagram of pixels in another display panel consistent with various disclosed embodiments in the present disclosure.

For example, in one embodiment, the enable level time of the switch control signal SW may indicate the time when the driving chip provides the data signal to the data line 11, that is, the pre-writing stage T1 of the pixel P corresponding to the data signal, and the enable level time of the first scan signal S1 may represent the data writing stage T2 of the pixel P. As shown in FIG. 3 and FIG. 4, when entering the pre-writing stage T1 of the pixel P, the switch control signal SW may become the enable level, such that the data signal provided by the driving chip may be written to the data line 11 electrically connected to the pixel P. And, when entering the data writing stage T2 of the pixel P, the first scan signal S1 may become the enable level, such that the data signal transmitted by the data line 11 may be written into the pixel P.

As shown in FIG. 3, the plurality of pixels P in the display panel 100 may at least include first pixels P1 whose luminous color is a first color. The first color may be red, green or blue. Preferably, in one embodiment, the first color may be green, to which the human eye is more sensitive, that is, the luminous color displayed by the first pixels P1 may be green. The change in display brightness caused by a small change in the data signals received by the first pixels P1 may be easily perceived by the human eye, thereby affecting the display effect of the display panel 100.

Also, the plurality of pixels P may include second pixels P2 whose luminous color is a second color. The first color may be different from the second color. For example, when the first color is green, the second color may include at least one of red or blue. At this time, the plurality of pixels P may include pixels (G1 and G2) whose luminous color is green, pixels (R1 and R2) whose luminous color is red, and pixels (B1 and B2) whose luminous color is blue.

Figure 5:
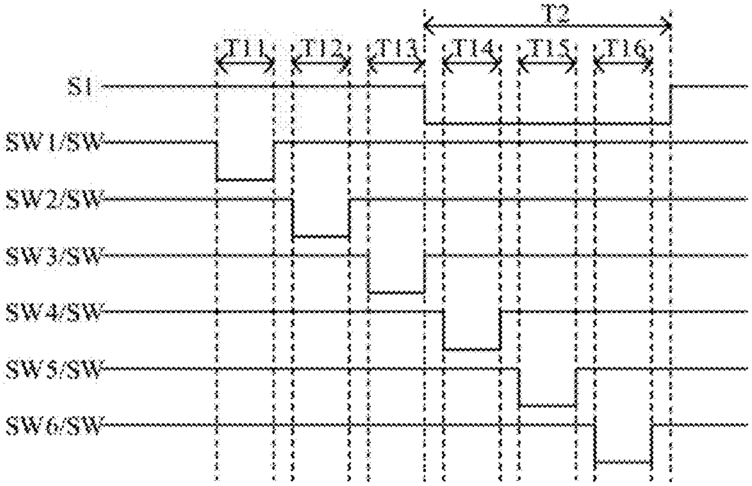
FIG. 5 illustrates a driving timing diagram of another display panel consistent with various disclosed embodiments in the present disclosure.

In existing technologies, because of the limitation of the driving cost of the display panel, the number of data terminals for providing data signals in the driver chip is less than the number of the plurality of data lines in the display panel, that is, each data terminal of the driver chip is used to provide data signals to multiple data lines, and provides data signals to each data line corresponding to the same data terminal in a time-sharing manner. For example, as shown in FIG. 1 and FIG. 5, six pixels located in the same row and adjacent to each other are pixel R1, pixel G1, pixel B1, pixel R2, pixel G2, and pixel B2, and the six pixels are electrically connected to different data lines 11, respectively. When the six data lines 11 electrically connected to the six pixels P correspond to the same data terminal, data signals are provided to the six data lines 11 in a time-sharing manner. That is, when the switch control signal SW1 is at the enable level, a data signal is provided to the data line 11 electrically connected to the pixel R1, and this is the pre-writing stage T11 of the pixel R1. When the switch control signal SW2 is at the enable level, a data signal is provided to the data line 11 electrically connected to the pixel G1, and this is the pre-writing stage T12 of the pixel G1. When the switch control signal SW3 is at the enable level, a data signal is provided to the data line 11 electrically connected to the pixel B1, and this may be the pre-writing stage T13 of the pixel B1. When the switch control signal SW4 is at the enable level, a data signal is provided to the data line 11 electrically connected to the pixel R2, and this can be the pre-writing stage T14 of the pixel R2. When the switch control signal SW5 is at the enable level, a data signal is provided to the data line 11 electrically connected to the pixel G2, and this can be the pre-writing stage T15 of the pixel G2. When the switch control signal SW6 is at the enable level, a data signal is provided to the data line 11 electrically connected to the pixel B2, and this can be the pre-writing stage T16 of the pixel B2. In this way, the pre-writing stages of some pixels P located in the same row are able to be performed in time division.

Since the pixels P in the same row are electrically connected to the same first scan line 21, the pixels P in the same row may receive the first scan signal S1 transmitted by the same first scan line 21. When the first scan signal S1 transmitted by the first scan line 21 is at the enable level, the pixels P electrically connected to the first scan line 21 may enter the data writing stage T2 at the same time. To ensure that the data signals located in the pixels P are able to be written to the pixels one by one, at least before the time when the first scan signal S1 transmitted by the first scan line 21 jumps from the enable level to the non-enable level, the pre-writing stage of the pixels P electrically connected to the first scan line 21 may be completed. At this time, the pre-writing stage (T11, T12 and T13) of some pixels P may be located before the time when the first scan signal S1 transmitted by the first scan line 21 jumps from the non-enable level to the enable level, and the pre-writing stage (T14, T15 and T16) of some pixels P may be located within the time when the first scan signal S1 transmitted by the first scan line 21 is at the enable level.

The pixels P in the same row may be electrically connected to the same first scan line 21, and the pixels P in the same column may be electrically connected to the same data line 11, such that each first scan lines 21 extend along the first direction X and is arranged along the second direction Y, and each data lines 11 extend along the second direction Y and is arranged along the first direction X, where the first direction intersects with the second direction. Therefore, one first scan line 21 may intersect with one corresponding data line 11, and a capacitor may be formed at the position where the first scan line 21 and the corresponding data line 11 overlap. Because of the coupling effect of the capacitor, when the first scan signal S1 transmitted on the first scan line 21 jumps, the signal on the data line 11 may change accordingly. Correspondingly, when the jump value of the first scan signal S1 on the first scan line 21 is coupled to the data line 11, the data signal provided to the data line 11 may change accordingly, and the data signal received by each pixel P electrically connected to the part of the data line 11 may be the data signal after the jump coupling of the first scan signal S1. For the data line 11 to which the data signal has not been written, although it may also be affected by the coupling effect when the first scan signal S1 on the first scan line 21 jumps, the data signal may be provided to the part of the data line 11 only after the first scan signal S1 transmitted on the first scan line 21 jumps from the non-enable level to the enable level, such that the data signal on the part of the data line 11 may not change with the jump of the first scan signal S1 and the data signal received by each pixel P electrically connected to the part of the data line 11 may be the data signal that has not been coupled after the jump coupling of the first scan signal S1.

When the data signals written into each pixel P are different, the displayed luminous brightness of each pixel P may be different. And, when the display panel 100 includes pixels P with different luminous colors and the data signals received by the pixels P with different luminous colors change, there may be certain differences in the changes in their displayed luminous brightness. For example, for the case where the displayed luminous color of one pixel P is a color that the human eye is more sensitive to, the change in the displayed luminous brightness caused by a small change in the data signal received by the pixel P may be perceived by the human eye, and the impact of this brightness change on the display effect cannot be ignored. For one pixel P whose displayed luminous color is a color that the human eye is not sensitive to, even when the data signal received changes and causes the displayed luminous brightness to change, the change in brightness may not be easily perceived by the human eye. The impact of this brightness change on the display effect may be ignored.

As shown in FIG. 1 and FIG. 5, the pre-writing stage T11 of the pixel R1, the pre-writing stage T12 of the pixel G1 and the pre-writing stage T13 of the pixel B1 may be located before the first scan signal S1 transmitted by the first scan line 21 jumps from the non-enable level to the enable level. When the first scan signal S1 transmitted by the first scan line 21 jumps from the non-enable level to the enable level, the data signal on the data line 11 electrically connected to the pixel R1, the data signal on the data line 11 electrically connected to the pixel G1, and the data signal on the data line 11 electrically connected to the pixel B1 may change accordingly, such that the data signal written to the pixel R1, the pixel G1 and the pixel B1 is the changed data signal when entering the data writing stage T2 of the pixel R1, the pixel G1 and the pixel B1 during the time period when the first scan signal S1 is the enable level. Therefore, the brightness of the pixel R1, the pixel G1 and the pixel B1 when displaying luminous according to the data signals they receive may respectively change. However, the pre-writing stage T14 of pixel R2, the pre-writing stage T15 of pixel G2 and the pre-writing stage T16 of pixel B2 may be located after the first scan signal S1 transmitted by the first scan line 21 jumps from the non-enable level to the enable level, such that the pre-writing stage T14 of pixel R2, the pre-writing stage T15 of pixel B2 and the pre-writing stage T16 of pixel G2 will be entered in sequence after the first scan signal S1 changes to the enable level while entering the data writing stage T2 of each pixel P. Therefore, the data signals on the data lines 11 electrically connected to the pixels R2, B2 and G2 respectively may not change with the jump of the first scan signal S1, and the data signals may be accurately written into the pixels R2, G2 and B2 in the data writing stage, such that the pixels R2, G2 and B2 may accurately emit light according to the data signals provided to each data line. In this way, when the overlap between the pre-writing stage and the data writing stage of each pixel P in the same row is different, the display luminous brightness of each pixel P may be different. In particular, when there is a brightness difference between the pixels P (pixel G1 and pixel G2) whose display luminous colors are colors that the human eye is more sensitive to (such as green), obvious vertical display stripes may appear, affecting the display effect of the display panel. In addition, when the display mode of the display panel 100 is a mode with a low refresh rate, the display time of a frame of the display panel 100 may be longer. As time goes by, the display luminous brightness of each pixel may decrease, and the brightness difference between each pixel P may be more obvious, which makes the display vertical stripes of the display panel more obvious.

To at least partially alleviate the above problem, in one embodiment of the present disclosure, when the display mode of the display panel 100 is a first mode, there may be at least one first scan line 21 transmitting a first scan signal S1 whose enable level time covers the pre-writing stage of each first pixel P1 in at least part of the pixel rows, or the non-enable level time of the first scan signal S1 transmitted by each first scan line 21 may cover the pre-writing stage of each first pixel P1 in at least part of the pixel rows.

In one embodiment, the first mode may be a display mode in which the refresh frequency of the display panel 100 is less than the preset refresh frequency, that is, a display mode in which the display panel 100 has a lower refresh frequency. At this time, the display time of a frame of the display panel may be longer. Or, the first mode may also be a display mode in which the display brightness of the display panel 100 is less than the preset brightness, that is, a display mode in which the display panel 100 has a lower display brightness. At this time, the human eye may be more sensitive to the brightness change of the display panel 100, such that a smaller brightness change of the display panel 100 can be recognized by the human eye. Exemplarily, the preset refresh frequency may be less than or equal to 60 Hz, or the preset brightness may be less than or equal to 100 nit, which may be designed according to actual needs, and the embodiments of the present disclosure not specifically limit this.

Figure 6:
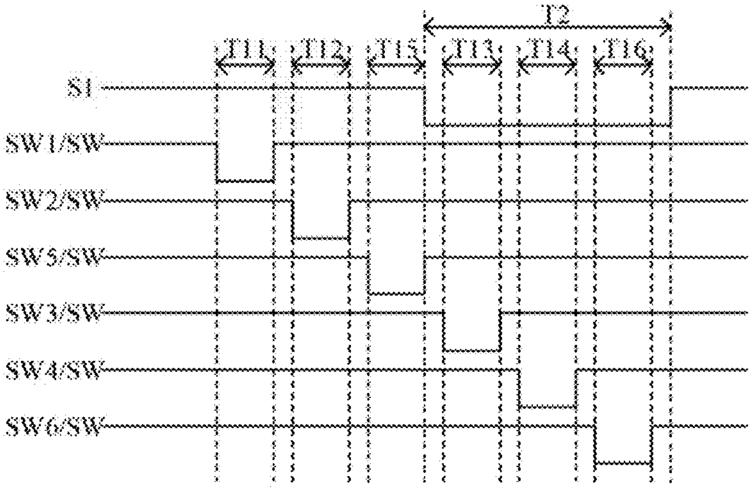
FIG. 6 illustrates a driving timing diagram of another display panel consistent with various disclosed embodiments in the present disclosure.

In one exemplary embodiment, as shown in FIG. 1 and FIG. 6, when the first pixels P1 are pixels (G1, G2) whose luminous color is green, among the pixels P located in the same row, the pre-writing stage T12 of the first pixel G1 and the pre-writing stage T15 of the first pixel G2 may be both located within the non-enable level time of the first scan signal S1 transmitted by each first scan line 21. Thus, because of the jump of the first scan signal S1 transmitted by the first scan line 21, the data signals on the data lines 11 electrically connected to the first pixel G1 and the first pixel G2 may respectively have the same change, such that the first pixels P1 have the same display luminous brightness change, thereby preventing the display panel from displaying vertical stripes because of the inconsistent display luminous brightness change of the first pixels P1 in the same row. The display effect of the display panel 100 may be improved.

Figure 7:
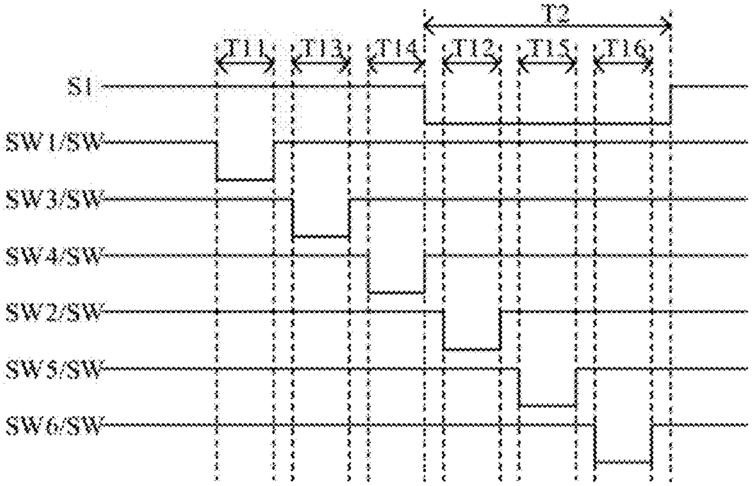
FIG. 7 illustrates a driving timing diagram of another display panel consistent with various disclosed embodiments in the present disclosure.

In another exemplary embodiment, as shown in FIG. 1 and FIG. 7, also taking the pixels (G1, G2) whose light emitting color is green as the first pixel P1 as an example, when the pre-writing stage T12 of the first pixel G1 and the pre-writing stage T15 of the first pixel G2 in each pixel P located in the same row are located within the enable level time of the first scan signal S1 transmitted by any first scan line 21, the data signal of each first pixel P1 (G1, G2) may also be kept consistent with the change of the first scan signal S1, such that each first pixel P1 has the same display light emitting brightness change. The display panel may also be prevented from displaying vertical stripes because of the inconsistent display light emitting brightness change of each first pixel P1 in the same row, which may be beneficial to improve the display effect of the display panel 100.

Figure 8:
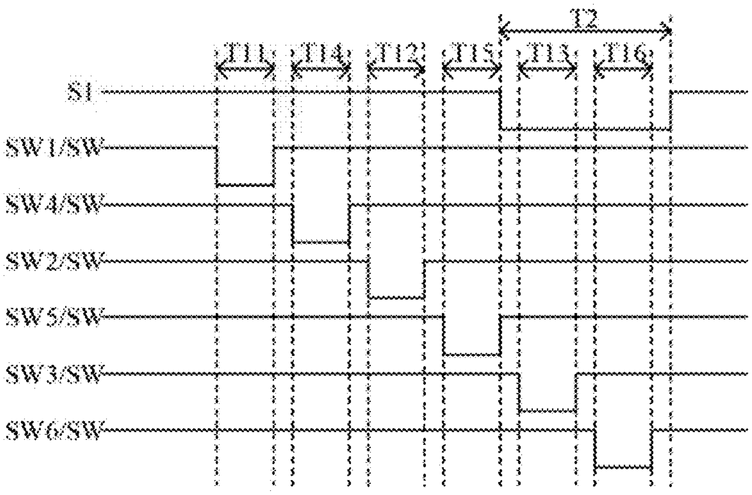
FIG. 8 illustrates a driving timing diagram of another display panel consistent with various disclosed embodiments in the present disclosure.

In yet another optional embodiment, as shown in FIG. 1 and FIG. 8, the first pixels P1 may be pixels of any color. In this case, the pre-writing stages of the pixels P located in the same row and having the same color may be all located within the non-enable level time of the first scan signal S1 transmitted by each first scan line 21, or may be all located within the enable level time of the first scan signal S1 transmitted by one of the first scan lines 21. For example, the pre-writing stage T11 of the pixel R1 and the pre-writing stage T14 of the pixel R2 may be both located within the non-enable level time of the first scan signal S1, the pre-writing stage T12 of the pixel G1 and the pre-writing stage T15 of the pixel G2 may be both located within the non-enable level time of the first scan signal S1, and the pre-writing stage T13 of the pixel B1 and the pre-writing stage T13 of the pixel B2 may be both located within the enable level time of the first scan signal S1. In this way, the data signals of the pixels P located in the same row may have changes in the data signals in the same manner, such that the display luminous brightness changes of the pixels P located in the same row and having the same color may be kept consistent, improving the display of vertical stripes while improving the display effect of the display panel.

The above embodiments where the first pixels P1 have a green luminous color are used as examples to illustrate the present disclosure, and do not limit the scope of the present disclosure. In various embodiments, the luminous color of the first pixels P1 may be configured according to actual needs, and the present disclosure has no limit on this, as long as the display of the vertical stripes is improved.

In the present disclosure, the pre-writing stage of the first pixels located in the same row may be uniformly located within the enable level time or the non-enable level time of the first scan signal, such that the changes in the data signals received by the first pixels located in the same row because of the jump of the first scan signal remains consistent when the first scan signal jumps between the enable level and the non-enable level. Therefore, the change in the display luminescence brightness of each first pixel located in the same row may be kept consistent, thereby improving the display uniformity of the first pixels located in the same row and preventing the occurrence of vertical stripes because of different display luminescence brightness of the first pixels located in the same row. When the display luminescence color of the first pixels is a color that the human eye is sensitive to, by improving the display uniformity of each first pixel located in the same row, the overall display uniformity of the display panel may be improved, preventing the human eye from observing obvious display vertical stripes, and thus helping to improve the display effect of the display panel.

Figure 9:
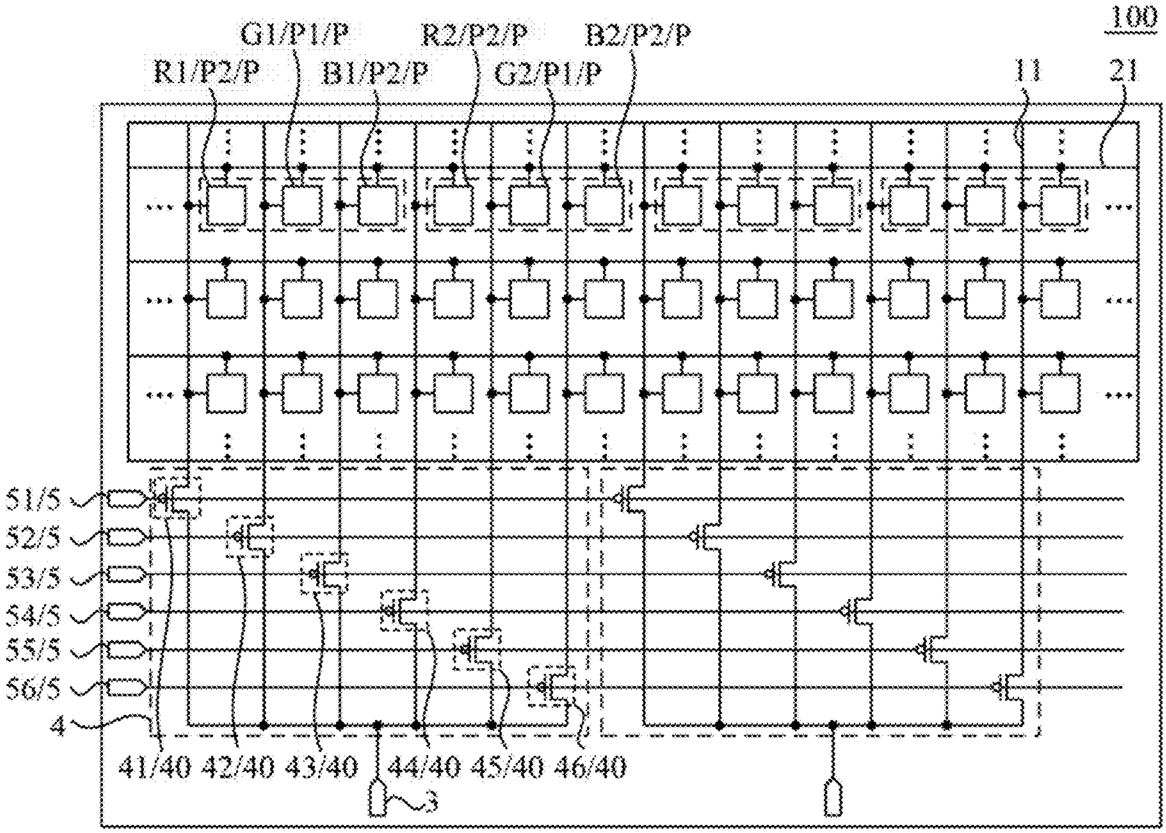
FIG. 9 illustrates another display panel consistent with various disclosed embodiments in the present disclosure.

In one embodiment shown in FIG. 9 which illustrates another exemplary display panel, the display panel 100 may further include a plurality of data terminals 3 and a plurality of multiplexer circuits 4. The plurality of multiplexer circuits 4 may include a plurality of switch modules 40. A control terminal of each switch module 40 of one same multiplexer circuit 4 may receive a different switch control signal SW, and the switch control signals SW may control each switch module 40 of the same multiplexer circuit 4 to be turned on in a time-sharing manner. An input terminal of each switch module 40 of the same multiplexer circuit 4 may be electrically connected to the same data terminal 3. An output terminal of each switch module 40 may be electrically connected to one corresponding data line 11 respectively. In the pre-writing stage of the pixel P electrically connected to the data line 11 corresponding to one switch module 40, the switch control signal SW received by the switch module 40 may be an enable level.

Each switch module 40 of the same multiplexer circuit 4 may receive a different switch control signal SW respectively, such that each switch module 40 of the same multiplexer circuit 4 is turned on in a time-sharing manner and the data signal provided by the data terminal 3 is provided to each data line 11 in a time-sharing manner through each switch module 40 of the same multiplexer circuit 4. Therefore, the pre-writing stage of each pixel P electrically connected to the data line 11 may be executed in a time-sharing manner, and it may be not necessary to set a data terminal 3 for each data line 11. The number of the data terminals 3 in the display panel 100 and the cost of the display panel 100 may be reduced.

In one optional embodiment, one switch module 40 may include a switch transistor. A gate of the switch transistor may receive a switch control signal SW, a first electrode of the switch transistor may be electrically connected to the data terminal 3, and a second electrode of the switch transistor may be electrically connected to the data line 11. The switch transistor may be turned on or off under the control of the switch control signal SW. When the switch control signal SW controls the switch transistor to be turned on, the data signal at the data terminal 3 may be provided to the data line 11 through the turned-on switch transistor, to enter the pre-writing stage of the pixel P electrically connected to the data line 11.

The switch transistor may be a P-type transistor or an N-type transistor, which may be designed according to actual needs, and the embodiments of the present disclosure do not specifically limit this. When the switch transistor is an N-type transistor, the enable level of the switch control signal SW that controls the switch transistor to be turned on may be a high level, and the enable level of the switch control signal SW that controls the switch transistor to be turned off may be a low level. When the switch transistor is a P-type transistor, the enable level of the switch control signal SW that controls the switch transistor to be turned on may be a low level, and the enable level of the switch control signal SW that controls the switch transistor to be turned off may be a high level. For the convenience of description, without special limitations, the embodiments where the switch transistor is a P-type transistor will be used as an example to exemplify the technical solution of the embodiments of the present disclosure.

As shown in FIG. 8 and FIG. 9, in one embodiment, each multiplexer selection circuit 4 may include six switch modules 40 (41, 42, 43, 44, 45, 46), and the display panel 100 may further include at least six switch signal terminals 5 (51, 52, 52, 54, 55, 56). The control terminals of the switch modules 40 of the same multiplexer selection circuit 4 may be respectively electrically connected to the corresponding switch signal terminals 5. For example, the control terminal of the switch module 41 may be electrically connected to the switch signal terminal 51 to receive the switch control signal SW1 at the switch signal terminal 51, and the control terminal of the switch module 42 may be electrically connected to the switch signal terminal 52 to receive the switch signal SW2. The control terminal of the switch module 43 may be electrically connected to the switch signal terminal 53 to receive the switch control signal SW3 at the switch signal terminal 53, and the control terminal of the switch module 44 may be electrically connected to the switch signal terminal 54 to receive the switch control signal SW4 at the switch signal terminal 54. The control terminal of the switch module 45 may be electrically connected to the switch signal terminal 55 to receive the switch control signal SW5 at the switch signal terminal 55, and the control terminal of the switch module 46 may be electrically connected to the switch signal terminal 56 to receive the switch control signal SW6 at the switch signal terminal 56. Taking the data lines

11 electrically connected to the switch modules 40 in the same multiplexer circuit 4 as a data line group as an example, the pre-writing stage of the pixels P electrically connected to different data lines in the same data line group may be performed in a time-sharing manner.

Exemplarily, taking the driving process of the pixel P located in the same row and respectively connected to different data lines in the same data line group as an example, in the T11 stage, the switch control signal SW1 at the switch signal terminal 51 may be at the enable level, while the switch control signal SW at the other switch signal terminals 5 may be at the non-enable level, such that the switch control signal SW1 controls the switch module 41 to be in the on state and the data signal at the data terminal 3 is provided to the data line 11 through the switch module 41. Therefore, the T11 stage may be the pre-writing stage of the pixel R1 electrically connected to the data line 11. After the pre-writing stage T11 of the pixel R1 ends, the T14 stage may be entered. In the T14 stage, the switch control signal SW4 at the switch signal terminal 54 may be at the enable level, while the switch control signal SW at the other switch signal terminals 5 may be at the non-enable level, such that the switch control signal of the switch module 44 may be in the on state controlled by the signal SW4 and the data signal at the data terminal 3 may be provided to the data line 11 through the switch module 44. Therefore, the T14 stage may be the pre-writing stage of the pixel R2 electrically connected to the data line 11. After the pre-writing stage T14 of the pixel R2 ends, the T12 stage may be entered. In the T12 stage, the switch control signal SW2 at the switch signal terminal 52 may be the enable level, and the switch control signal SW at the other switch signal terminal 5 may be the non-enable level, such that the switch control signal SW2 controls the switch module 42 to be in the on state and the data signal at the data terminal 3 may be provided to the data line 11 through the switch module 42. Therefore, the T12 stage may be the pre-writing stage of the pixel G1 electrically connected to the data line 11. After the pre-writing stage T12 of the pixel G1 ends, the T15 stage may be entered. In the T15 stage, the switch control signal SW5 at the switch signal terminal 55 may be at the enable level, while the switch control signal SW at the other switch signal terminal 5 may be at the non-enable level, such that the switch control signal SW5 controls the switch module 45 to be in the on state, and the data signal at the data terminal 3 is provided to the data line 11 through the switch module 45. Therefore, the T15 stage may be the pre-writing stage of the pixel G2 electrically connected to the data line 11. After the pre-writing stage T15 of the pixel G2 ends, the T13 stage may be entered. In the T13 stage, the switch control signal SW3 at the switch signal terminal 53 may be at the enable level, while the switch control signal SW at the other switch signal terminal 5 may be at the non-enable level, such that the switch control signal SW3 controls the switch module 43 to be turned on, and the data signal at the data terminal 3 may be provided to the data line 11. Therefore, the T13 stage may be the pre-writing stage of the pixel B1 electrically connected to the data line 11. After the pre-writing stage T13 of the pixel B1 ends, the T16 stage may be entered. In the T16 stage, the switch control signal SW6 at the switch signal terminal 56 may be the enable level, and the switch control signal SW at the other switch signal terminal 5 may be the non-enable level, such that the switch control signal SW6 controls the switch module 46 to be in the on state, and the data signal at the data terminal 3 may be provided to the data line 11 through the switch module 46. Therefore, the T16 stage may be the pre-writing stage of the pixel B2 electrically connected to the data line 11. After the pre-writing stage T16 of the pixel B2 ends, the switch control signal SW1 at the switch signal terminal 51 may become the enable level again, thereby entering the pre-writing stage of the next row of pixels P.

Figure 10:
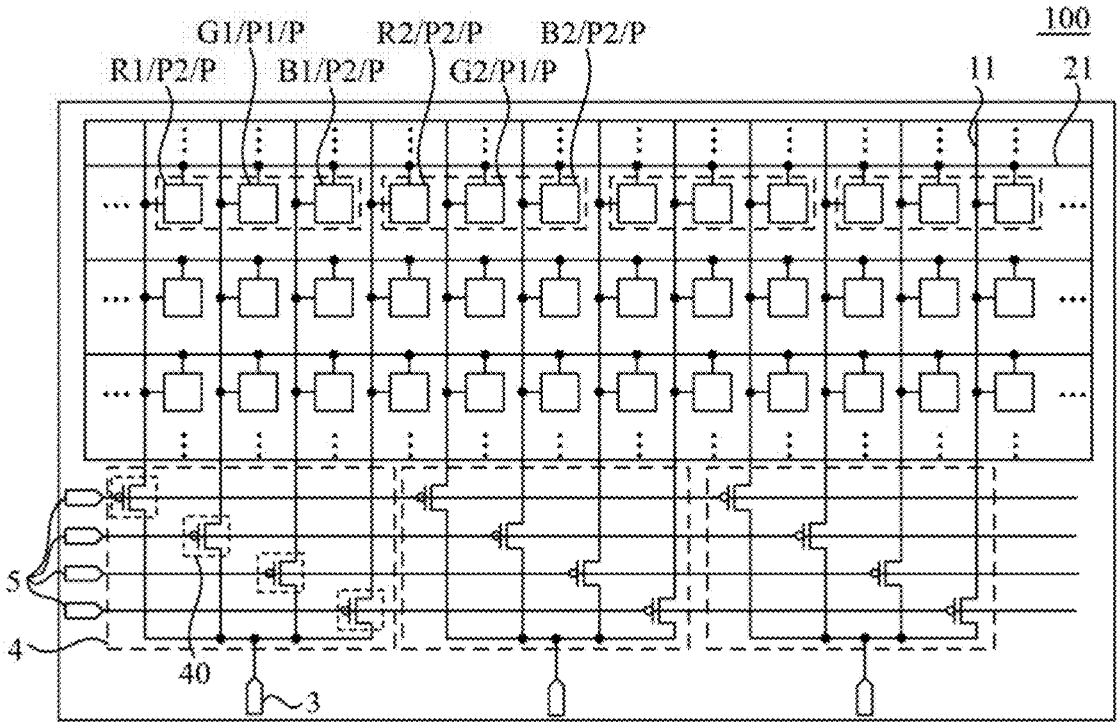
FIG. 10 illustrates another display panel consistent with various disclosed embodiments in the present disclosure.

The embodiment shown in FIG. 9 uses each multiplexer circuit including six switch modules as an example. In another embodiment shown in FIG. 10, each multiplexer circuit may include four switch modules. In some other embodiments, each multiplexer circuit may include 2, 3, 5, 7, or more switch modules, which may be configured according to actual needs, and the present disclosure does not limit this. Unless specified otherwise, the embodiments where each multiplexer circuit includes six switch modules will be used as examples to illustrate the present disclosure.

When the display panel 100 includes pixels P of different luminous colors, the pixels P of different luminous colors may have different luminous efficiencies because of differences in structure and preparation materials. For example, when the pixels P includes a first pixel P1 of a first luminous color and a second pixel P2 of a second luminous color, the luminous efficiency of the first pixel P1 may be different from that of the second pixel P2. At this time, the duration of the pre-writing stage of the pixels P with different luminous efficiencies may be the same or different, and the embodiments of the present disclosure do not specifically limit this.

In one optional embodiment, when the pixel P includes a first pixel P1 of a first luminous color and a second pixel P2 of a second luminous color, and the luminous efficiency of the first pixel P1 is different from that of the second pixel P2, if the duration of the enable level of the switch control signal SW received by the switch module 40 electrically connected to the first pixel P1 is the first duration, and the duration of the enable level of the switch control signal received by the switch module electrically connected to the second pixel is the second duration, the first duration may be different from the first duration.

One pixel P may be electrically connected to one corresponding switch module 40 through one corresponding data line 11, so that the switch module 40 electrically connected to the first pixel P1 may be understood as that the first pixel P1 is electrically connected to the corresponding switch module 40 through the data line 11 electrically connected to the first pixel P1. At this time, when the switch control signal SW received by the switch module 40 is at an enable level, a data signal may be provided to the data line 11 electrically connected to the first pixel P1, such that the time period when the switch control signal SW received by the switch module 40 is at an enable level may be the pre-writing stage of the first pixel P1. Similarly, the time period when the switch control signal SW received by the switch module 40 electrically connected to the second pixel P2 is at an enable level may be the pre-writing stage of the second pixel P2.

Exemplarily, taking the display panel as an organic light-emitting display panel as an example, the first pixel P1 may include a light-emitting element emitting a first color, and the second pixel P2 may include a light-emitting element emitting a second color. When the luminous efficiency of the light-emitting element in the first pixel P1 is higher than the luminous efficiency of the light-emitting element in the second pixel P2, the driving current provided to the light-emitting element of the second pixel P2 may be larger than the driving current provided to the light-emitting element of the first pixel P1 when the first pixel P1 and the second pixel P2 need to have the same display luminous brightness. Therefore, to make the light-emitting element in the second pixel P2 have sufficient display luminous brightness, the duration of the pre-writing stage of the second pixel P2 may be set to be larger than the duration of the pre-writing stage of the first pixel P1, such that sufficient data signals are provided to the data line 11 electrically connected to the second pixel P2 and the data signal on the data line 11 is prevented from being insufficiently written and from affecting the display luminous brightness of the second pixel P2 since the data signal written to the second pixel P2 in the data writing stage is different. The duration of the pre-writing stage of the second pixel P2 may be longer than the duration of the pre-writing stage of the first pixel P1. That is, taking the duration of the pre-writing stage of the first pixel P1 as a reference, a certain duration may be added to get the duration of the pre-writing stage of the second pixel P2. The specific implementation method may be designed according to actual needs. Under the premise of ensuring the accuracy of writing data signals of each pixel P, the embodiments of the present disclosure do not make specific limitations on this.

In the above embodiments, the first pixel P1 whose luminous efficiency is higher than the luminous efficiency of the second pixel P2 is used as an example to illustrate the present disclosure. In some other embodiments, the luminous efficiency of the first pixel P1 may also be less than that of the second pixel P2. Correspondingly, the duration of the pre-writing stage of the first pixel P1 may be set to be larger than that of the pre-writing stage of the second pixel P2.

The embodiment where the duration of the pre-writing stage of the pixel P with a smaller luminous efficiency is longer is used as an example to illustrate the present disclosure. In some other embodiments of the present disclosure, on the premise of ensuring that the data signal is accurately written to each pixel P, the duration of the pre-writing stage of the pixel P with a larger luminous efficiency may also be set to be longer. Alternatively, in yet some other embodiments, to simplify the driving method of the display panel 100, the duration of the pre-writing stage of all pixels P may also be set to the same duration. The design may be made according to actual needs, and the embodiments of the present disclosure do not make specific restrictions on this. For the convenience of description, unless specified otherwise, the embodiments with the same duration of the pre-writing stage of all pixels P will be used as examples to exemplify the technical solution of the embodiments of the present disclosure.

Figure 11:
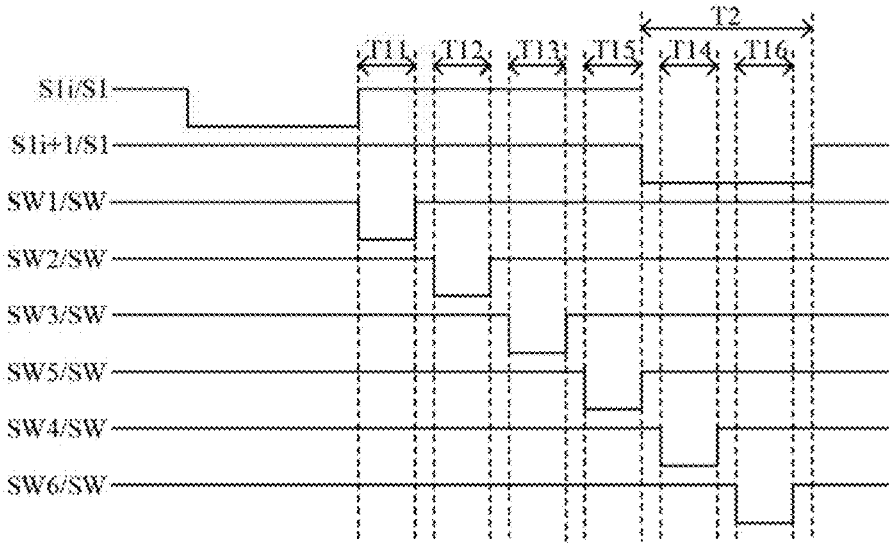
FIG. 11 illustrates a driving timing diagram of another display panel consistent with various disclosed embodiments in the present disclosure.
Figure 12:
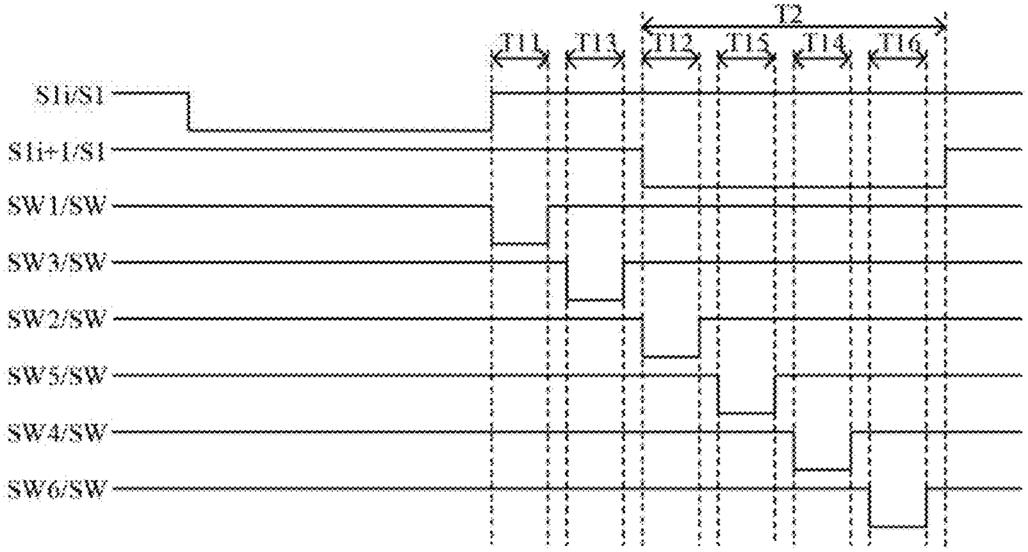
FIG. 12 illustrates a driving timing diagram of another display panel consistent with various disclosed embodiments in the present disclosure.

As shown in FIG. 9, FIG. 11 and FIG. 12, in one embodiment, the pixels P may include first pixels P1 emitting a first color and second pixels P1 emitting a second color, where the first color is different from the second color. The second pixels P2 may include a first-type second pixels (R1, B1) and a second-type second pixels (R2, B2). There may be at least one row of pixel rows as a first pixel row. In one first pixel row, the pre-writing stage (T11, T13) of the first-type second pixels (R1, B1) may overlap with the non-enable level time of the first scan signal S1, and the pre-writing stage of the second-type second pixels may overlap with the enable level time of the first scan signal.

There may be at least one row of pixel rows in the display panel 100 as the first pixel row, that is, the pixel rows in the display panel may include one or more rows of pixels as the first pixel rows. On the premise that the core invention of the embodiments of the present disclosure can be realized, the embodiments of the present disclosure do not specifically limit the number of first pixel rows in the display panel 100.

For example, in one embodiment, one same first pixel row may include a plurality of second pixels P2, where a portion of the plurality of second pixels P2 may be first-type second pixels and another portion of the plurality of second pixels P2 may be second-type second pixels. Taking the second color including red and blue as an example, the first-type second pixels may include pixel R1 and pixel B1, and the second-type second pixels may include pixel R2 and pixel B2. At this time, the pre-writing stage T11 of the pixel R1 and the pre-writing stage T12 of the pixel B1 may overlap with the non-enable level time of the first scan signal S1, and the pre-writing stage T14 of the pixel R2 and the pre-writing stage T16 of the pixel B2 may overlap with the enable level time of the first scan signal S1. In this way, the duration of the enable level of the first scan signal S1 may be flexibly set as needed, ensuring that the accuracy of data writing of each pixel P is guaranteed under the premise that the enable level time of the first scan signal S1 transmitted by each first scan line 21 does not overlap, thereby improving the display effect of the display panel 100.

When the enable level time of the first scan signal S1 transmitted by each first scan line 21 is shifted in sequence, the pre-writing stage (T11, T13) of the first-type second pixels (R1, B1) in the first pixel row may overlap with the non-enable level time of the first scan signal S1. It may be understood as that the pre-writing stage (T11, T13) of the first-type second pixels (R1, B1) overlaps with the enable level time of the first scan signal S1 transmitted by two adjacent first scan lines 21. That is, taking the pixel row composed of pixels located in the i+1th row as the first pixel row as an example, in the pixels of the (i+1)-th row, the pre-writing stage (T11, T13) of the first-type second pixels (R1, B1) may be located between the termination moment of the enable level of the first scan signal S1*i* and the termination moment of the first scan signal S1(*i*+1). In this way, by making the pre-writing stage (T11, T13) of the first-type second pixels (R1, B1) overlap with the non-enable level time of the first scan signal S1, and the pre-writing stage (T14, T16) of the second-type second pixels (R2, B2) overlap with the enable level time of the first scan signal S1, the interval time between the enable levels of the first scan signals S1 (S1*i* and S1(*i*+1)) transmitted by two adjacent first scan lines 21 may be flexibly set according to actual needs, to ensure that the first scan signals S1 transmitted by each first scan line 21 has a higher scanning efficiency for each row of pixels P, which is beneficial to improving the refresh frequency of the display panel 100 and further improving the display effect of the display panel 100.

Figure 13:
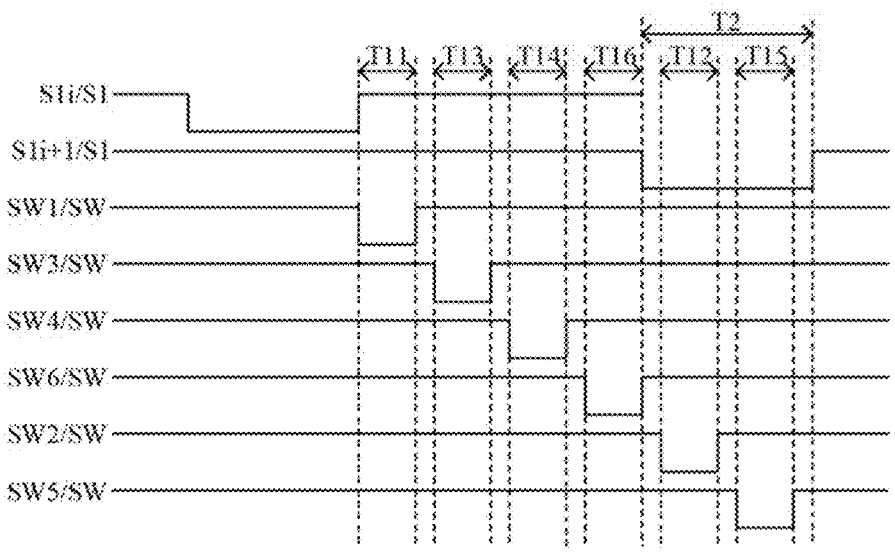
FIG. 13 illustrates a driving timing diagram of another display panel consistent with various disclosed embodiments in the present disclosure.
Figure 14:
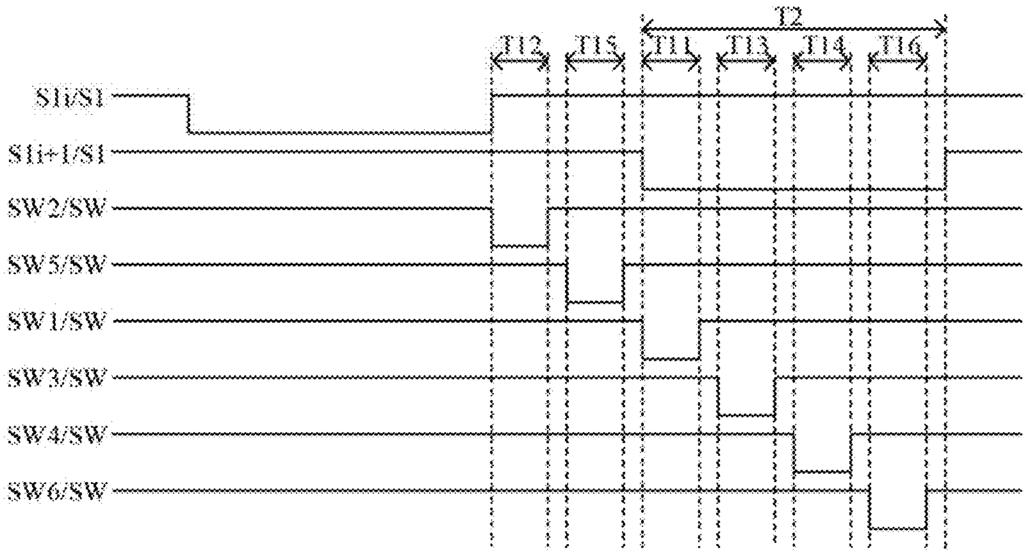
FIG. 14 illustrates a driving timing diagram of another display panel consistent with various disclosed embodiments in the present disclosure.

In another optional embodiment, as shown in FIG. 9, FIG. 13 and FIG. 14, when the pixel P simultaneously include first pixels P1 whose luminous color is a first color and second pixels P1 whose luminous color is a second color where the first color is different from the second color, among the pixels P located in the same row, when there is at least one first scan line 21 whose enable level of the first scan signal S1 transmitted covers the pre-writing stage of the first pixel P1, the non-enable level of the first scan signal S1 transmitted by each first scan line 21 may cover the pre-writing stage of the second pixels P2. Or, among the pixels P located in the same row, when the non-enable level of the first scan signal S1 transmitted by each first scan line 21 covers the pre-writing stage of the first pixel P1, there may be at least one first scan line 21 whose enable level of the first scan signal S1 transmitted covers the pre-writing stage of the second pixels P2.

In one embodiment shown in FIG. 9 and FIG. 13, for example, the first pixels P1 may include green pixels (G1, G2), and the second pixels P2 may include red pixels (R1, R2) and blue pixels (B1, B2). For the pixels in one same row, the enable level time of the first scan signal S(i+1) transmitted by the (i+1)-th first scan line 21 may cover the pre-writing stage (T12, T15) of the green pixels (G1, G2), and the time period between the enable level termination time of the first scan signal Si transmitted by the i-th first scan line 21 and the enable level start time of the first scan signal S(i+1) transmitted by the (i+1)-th first scan line 21 may sequentially perform the pre-writing stage T11 of the red pixel R1, the pre-writing stage T13 of the blue pixel B1, the pre-writing stage T14 of the red pixel R2 and the pre-writing stage T16 of the blue pixel B2. In this way, the time when each data line 11 electrically connected to each first pixel P1 located in the same row receives the data signal may be before the first scan signal S(i+1) jumps to the enable level, such that the data signal provided to the data line 11 electrically connected to the first pixel P1 may not change with the jump of the first scan signal S(i+1). Therefore, the data signal of the first pixel P1 whose luminous color is a color that the human eye is more sensitive to may be accurately written into the first pixel P1. Also, the time when each data line 11 electrically connected to each second pixel P2 located in the same row receives the data signal may be before the first scan signal S(i+1) jumps to the enable level, such that when the first scan signal S(i+1) jumps, its jump amount may be coupled to each data lines 11 connected to the second pixels P2. Therefore, the signals on the data lines 11 electrically connected to the second pixels P2 may be the sum of the coupling signals and the data signals received by the data lines 11. Since the data signals of all the second pixels P2 are increased by the corresponding coupling signals, the change amount of the data signals of the second pixels P2 may be kept consistent. After the data signals on the data lines 11 are written to the second pixels P2 in the data writing stage, compared with the case where the data signals provided to the data lines 11 are directly written to the second pixels P2, when the second pixels P2 display and emit light, the change of the display light luminance of the second pixels P2 may be kept consistent, thereby eliminating or improving the display vertical stripes and improving the display effect of the display panel.

Optionally, in one embodiment shown in FIG. 9 and FIG. 14, when the pixels P includes first-type pixels and second-type pixels, the pre-writing stage of the first-type pixels may not overlap with the data writing stage of the first-type pixels, and the pre-writing stage of the second-type pixels may overlap with the data writing stage of the second-type pixels.

Taking one embodiment where the first-type pixels include the first pixels P1 and the second-type pixels include the second pixels P2 as an example, the enable level time T2 of the first scan signal S(i+1) transmitted by the (i+1)-th first scan line 21 may include the data writing stage of the pixel P in the (i+1)-th row. At this time, for the pixels P in the (i+1)-th row, the pre-writing stage (T12, T15) of the first pixels P1 may be located before the enable level time T2 of the first scan signal S(i+1), such that the pre-writing stage (T12, T15) of the first pixels P1 does not overlap with the data writing stage T2 of the first pixel P1. The pre-writing stages of the second pixels P2 (T11, T13, T14, T16) may be within the enabling level time of the first scan signal S(i+1), such that the pre-writing stages (T11, T13, T14, T16) of the second pixels P2 overlap with the data writing stage of the second pixels P2. Therefore, under the premise of ensuring that the change amount of the data signal received by the pixels P of the same color remains consistent, the interval time of the enabling level of the first scan signal S1 transmitted by two adjacent first scan lines 21 may be adaptively adjusted, which is beneficial to improving the display refresh frequency of the display panel, and further beneficial to improving the display effect of the display panel.

The above description is only exemplified by taking the example that the first-type pixels include the first pixels P1 and the second-type pixels include the second pixels P2, that is, each first pixel P1 in one same row is a first-type pixel. In one embodiment of the present disclosure, the first-type pixels may include the second pixels P2 and the second-type pixels may include the first pixel P1, that is, each first pixel P1 in one same row may be a second-type pixel. Alternatively, in some other embodiments, the first-type pixels may include each first pixel P1 and a part of the second pixels P2, and the second-type pixels may include another part of the second pixels P2. Alternatively, in yet some other embodiments, the first-type pixels may include a part of the second pixels P2, and the second-type pixels may include another part of the second pixels P2 and each first pixel P1. On the premise that the core inventive point of the embodiments of the present disclosure can be realized, the embodiments of the present disclosure do not specifically limit the specific setting method of the first-type pixels and the second-type pixels.

In one embodiment, as shown in FIG. 9 and FIG. 15 to FIG. 18, the pixels P may include first pixels P1 and second pixels P2. The luminous color of the first pixels P1 may be a first color, and the luminous color of the second pixels P2 may be a second color. The first color and the second color may be different. Correspondingly, at least some pixel rows may be second pixel rows. Among the second pixels P2 located in one second pixel row, a part of the second pixels P2 may be first-type pixels, and another part of the second pixels P2 may be second-type pixels.

Figure 15:
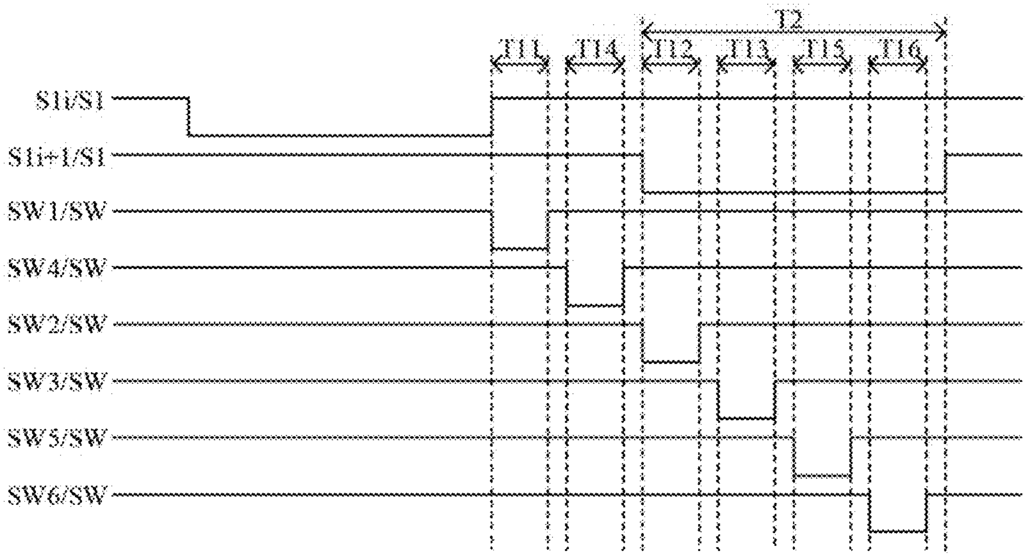
FIG. 15 illustrates a driving timing diagram of another display panel consistent with various disclosed embodiments in the present disclosure.
Figure 16:
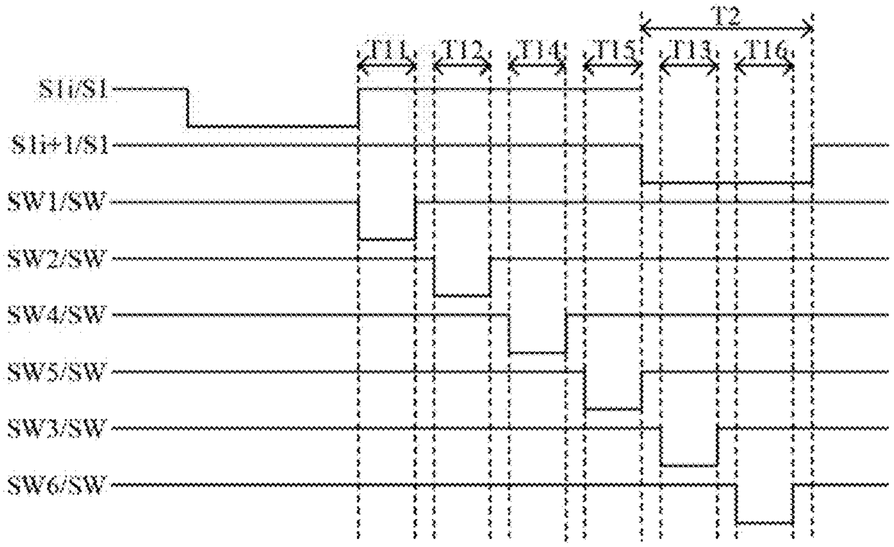
FIG. 16 illustrates a driving timing diagram of another display panel consistent with various disclosed embodiments in the present disclosure.
Figure 17:
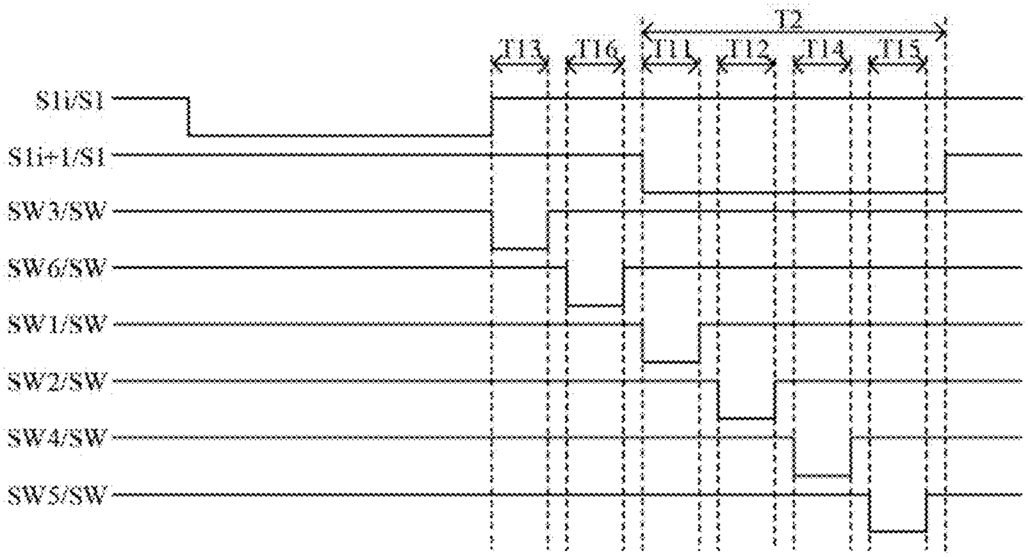
FIG. 17 illustrates a driving timing diagram of another display panel consistent with various disclosed embodiments in the present disclosure.
Figure 18:
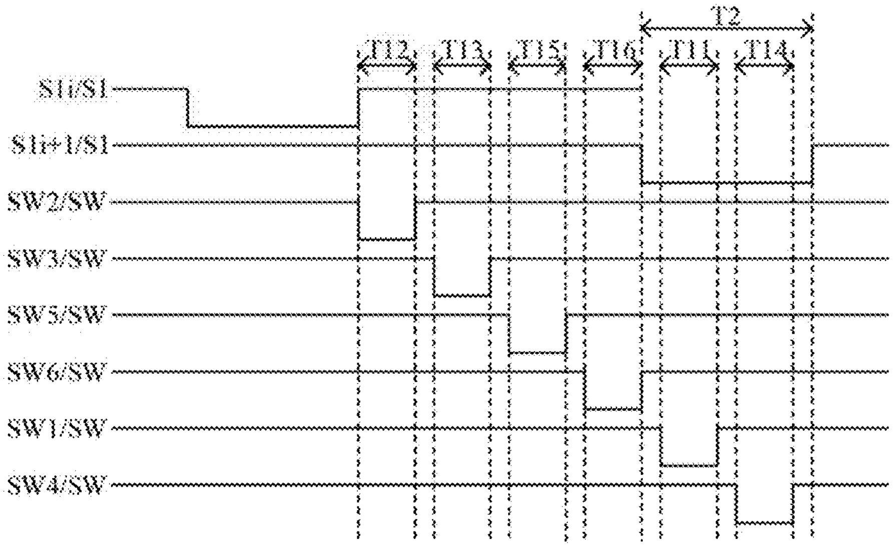
FIG. 18 illustrates a driving timing diagram of another display panel consistent with various disclosed embodiments in the present disclosure.

Exemplarily, in one embodiment shown in FIG. 9, FIG. 15 and FIG. 16, when the second pixels P2 includes red pixels (R1, R2) and blue pixels (B1, B2), taking the pixels in the (i+1)-th row as the second pixel row as an example, in each second pixel P2 located in the second pixel row, the red pixels (R1, R2) may be first-type pixels, and the blue pixels (B1, B2) may be second-type pixels. At this time, the pre-writing stages (T11, T14) of the red pixels (R1, R2) may not overlap with the enabling level time of the first scan signal S(i+1), such that the data signals of the red pixels (R1, R2) are written to the data lines 11 electrically connected to the red pixels (R1, R2) in the pre-writing stages (T11, T14) of the red pixels (R1, R2). After the pre-writing stages of the red pixels (R1, R2), the data writing stages T2 of the red pixels (R1, R2) may be entered, and the data signals on the data lines 11 may be written into the red pixels (R1, R2), such that the pre-writing stages of the red pixels (R1, R2) and the data writing stages of the red pixels (R1, R2) are carried out in time sharing. The pre-writing stages (T13, T16) of the blue pixels (B1, B2) may overlap with the enable level time of the first scan signal S(i+1), such that the data signals on the data lines 11 are written into the blue pixels (B1, B2) when the data signals of the blue pixels (B1, B2) are written to the data lines 11 electrically connected to the blue pixels (B1, B2). The pre-writing stages and the data writing stages of the blue pixels (B1, B2) may be carried out simultaneously.

The previous embodiment where the red pixels (R1, R2) in the second pixels P2 are first-type pixels and the blue pixels (B1, B2) in the second pixels P2 are second-type pixels is used as an example to illustrate the present disclosure only, and does not limit the scope of the present disclosure. In other exemplary embodiments, such as those shown in FIG. 9, FIG. 17 and FIG. 18, the blue pixels (B1, B2) in the second pixels P2 may be first-type pixels, and the red pixels (R1, R2) in the second pixels P2 may be second-type pixels. The specific classification method of the first-type pixels and the second-type pixels in the second pixels P2 may be designed according to actual needs, and the embodiments of the present disclosure do not specifically limit this.

The above description is merely exemplified by taking the time period during which the first scan signal S1 received by the pixel P is at the enable level as the data writing stage T2 of the pixel P. In some other embodiments, the enable level time of the first scan signal S1 may cover the data writing stage of the pixel P. That is, the enable level time of the first scan signal S1 may include the data writing stage and other non-data writing stages of the pixel P, and the embodiments of the present disclosure do not specifically limit this.

Figure 19:
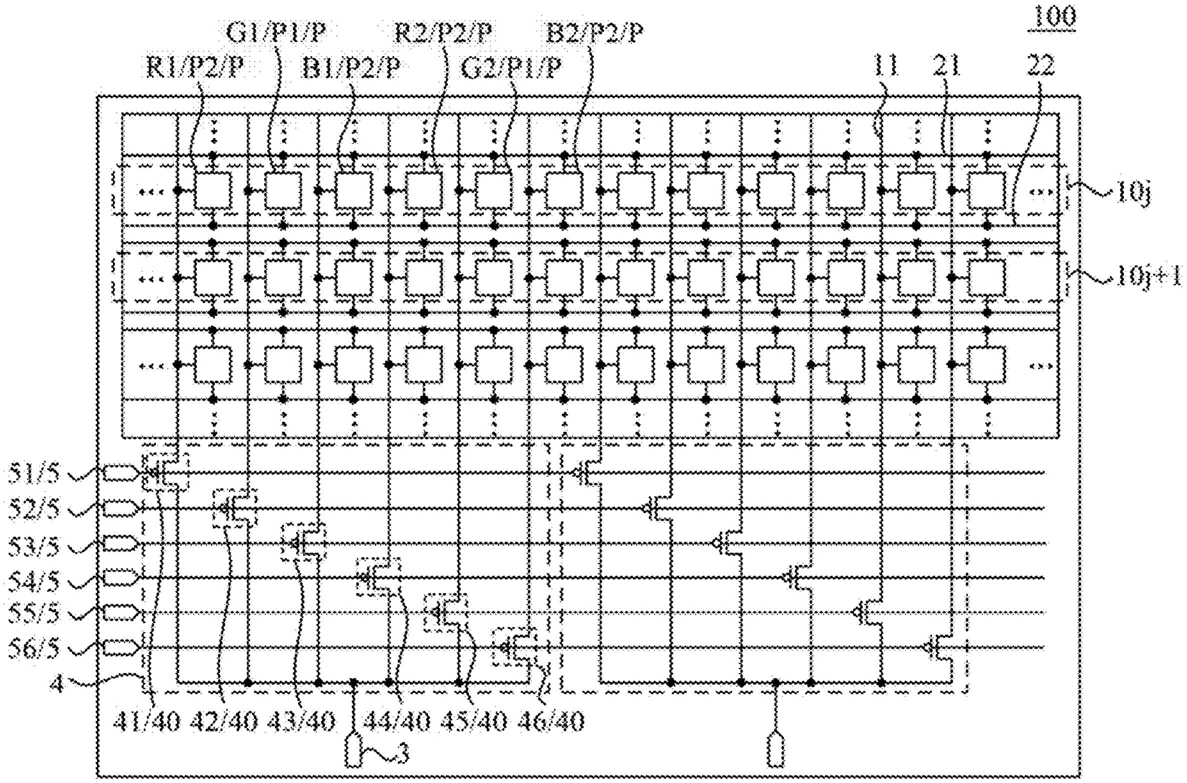
FIG. 19 illustrates another exemplary display panel consistent with various disclosed embodiments in the present disclosure.
Figure 20:
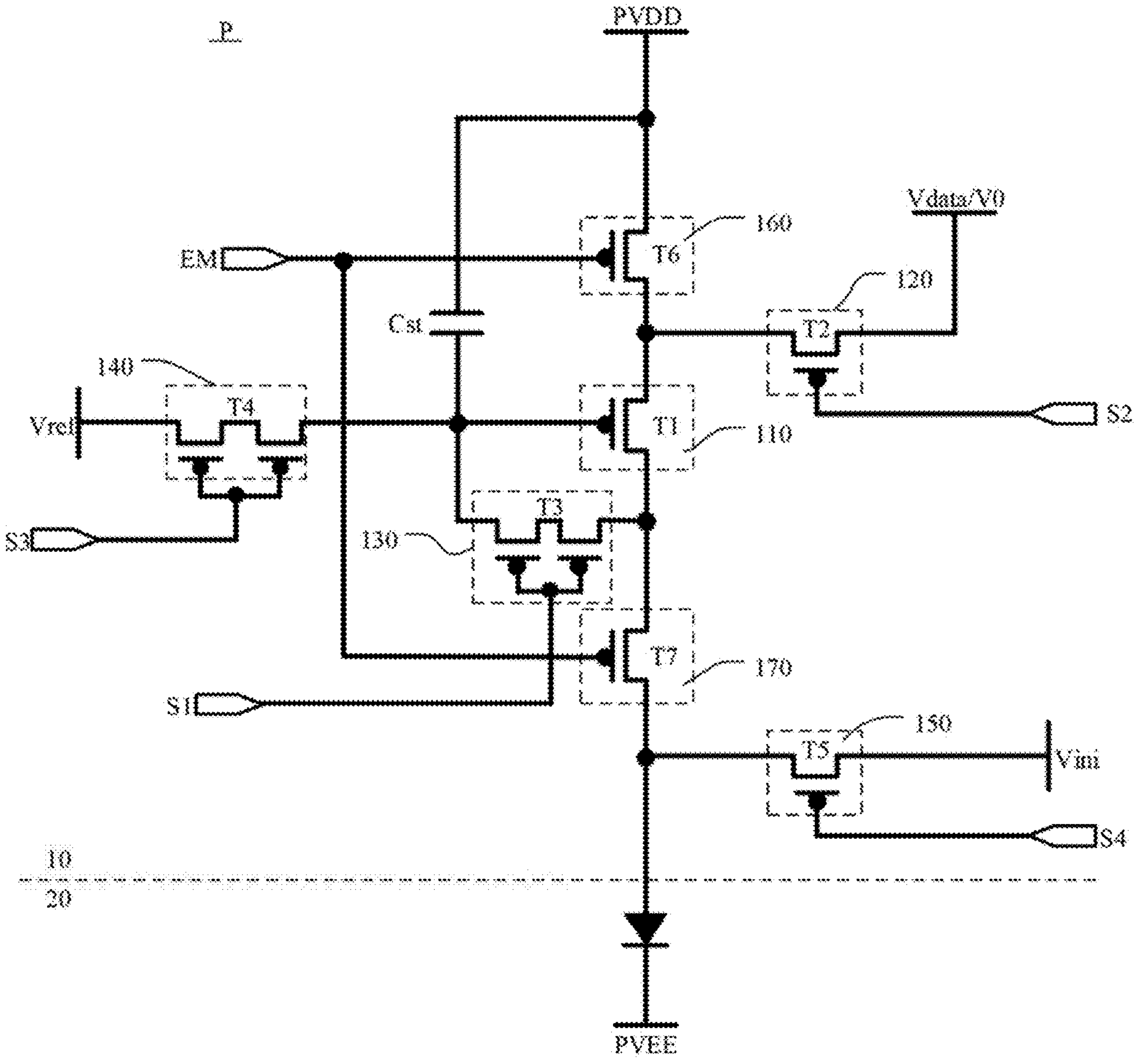
FIG. 20 illustrates a pixel in an exemplary display panel consistent with various disclosed embodiments in the present disclosure.

In one embodiment, as shown in FIG. 19 which illustrates another exemplary display panel and FIG. 20 illustrating a pixel in a display panel, the display panel 100 may further include a plurality of second scan lines 22. One pixel P may include a pixel circuit 10 and a light emitting element 20. The pixel circuit 10 may include a compensation module 130, a data writing module 120, and a driving module 110. The driving module 110 may include a driving transistor T1. The data writing module 120 may be used to control the data signal on the data line 11 to be written to the driving module 110 during the data writing stage. The compensation module 130 may be used to compensate the threshold voltage of the driving transistor T1 to the driving module 110 at least during the data writing stage. The driving module 110 may be used to provide the driving current to the light-emitting element 20 selectively. The compensation module 130 of each pixel P in one same pixel row may be electrically connected to one same first scan line 21, and the data writing module 120 of each pixel P in the same pixel row may be electrically connected to one same second scan line 22. The first scan signal S1 may be used to control the compensation module 130 to be turned on or off, and the second scan signal S2 transmitted by the second scan line 22 may be used to control the data writing module 120 to be turned on or off. The enable level time of the first scan signal S1 received by the same pixel P may cover the enable level time of the second scan signal S2.

The data writing module 120 may be connected to the first electrode of the driving transistor T1, and the compensation module 130 may be connected between the gate and the second electrode of the driving transistor T1. When the data writing module 120 and the compensation module 130 are turned on at the same time, the data signal Vdata received by the data writing module 120 may be written to the gate of the driving transistor T1 through the data writing module 120, the driving transistor T1 and the compensation module 130 in sequence, and the threshold voltage of the driving transistor T1 may be compensated to the gate of the driving transistor T1. Therefore, at the end of the data writing stage, the gate voltage of the driving transistor T1 may be the sum of the threshold voltage of the driving transistor T1 and the voltage of the data signal received by the data writing module 120. After entering the light-emitting stage of the light-emitting element 20, the driving current provided to the light-emitting element 20 by the driving transistor T1 according to the signal of its gate may be independent of the threshold voltage of the driving transistor T1, thereby preventing the driving current provided to the light-emitting element 20 from being affected by the threshold drift of the driving transistor T1, and ensuring that the light-emitting element 20 can accurately display light.

Since the enable level time of the first scan signal S1 covers the enable level time of the second scan signal S2 and the data signal Vdata transmitted by the data line 11 electrically connected to the pixel P is written to the gate of the driving transistor T1 of the pixel P when the first scan signal S1 and the second scan signal S2 are both at the enable level, the data writing stage of the pixel P may be a time period in which the second scan signal S2 and the first scan signal S1 received by the pixel P are both at the enable level, and the pre-writing stage of the pixel P may overlap with the non-enable level time of the first scan signal S1, the enable level time of the first scan signal S1, or the enable level time of the second scan signal S2. When the pre-writing stage of the pixel P overlaps with the enable level time of the first scan signal S1 and the enable level time of the second scan signal S2 received by the pixel P at the same time, the pre-writing stage and the data writing stage of the pixel P may the same time period. For other situations, the pre-writing stage of the pixel P and its data writing stage may be different time periods, that is, the pre-writing stage and the data writing stage of the pixel P are performed in time-sharing.

The pre-writing stage and the data writing stage of the pixel P may be performed in time-sharing or simultaneously. Under the premise that the core inventive point of the embodiments of the present disclosure can be realized, the embodiments of the present disclosure do not make specific limitations on this. For the convenience of description, unless specified otherwise, the embodiments where the pre-writing stage and the data writing stage of the pixel P are performed in time-sharing will be used as examples to illustrate the present disclosure.

In one optional embodiment, the compensation module 130 may include a compensation transistor T3, and the data writing module 120 may include a data writing transistor T2. The gate of the data writing transistor T2 may be electrically connected to the second scan line 22 to receive the second scan signal S2 transmitted by the second scan line 22, the first electrode of the data writing transistor T2 may be electrically connected to the data line 11 to receive the data signal Vdata transmitted by the data line 11, and the second electrode of the data writing transistor T2 may be electrically connected to the first electrode of the driving transistor T1. The gate of the compensation transistor T3 may be electrically connected to the first scan line 21 to receive the first scan signal S1 transmitted by the first scan line 21, the first electrode of the compensation transistor T3 may be electrically connected to the second electrode of the driving transistor T1, and the second electrode of the compensation transistor T3 may be electrically connected to the gate of the driving transistor T1.

The data writing transistor T2 and the compensation transistor T3 may be NMOS transistors or PMOS transistors, and may be designed according to actual needs. The present disclosure does not have limit on this.

When the data writing transistor T2 is an NMOS transistor, the enable level of the second scan signal S2 may be a high level, and the non-enable level of the second scan signal S2 may be a low level. That is, when the second scan signal S2 is a high level, the data writing transistor T2 may be turned on, and when the second scan signal S2 is a low level, the data writing transistor T2 may be turned off. When the data writing transistor T2 is a PMOS transistor, the enable level of the second scan signal S2 may be a low level, and the non-enable level of the second scan signal S2 may be a high level. That is, when the second scan signal S2 is a low level, the data writing transistor T2 may be turned on, and when the second scan signal S2 is a high level, the data writing transistor T2 may be turned off.

Similarly, when the compensation transistor T3 is an NMOS transistor, the enable level of the first scan signal S1 may be a high level, and the non-enable level of the first scan signal S1 may be a low level. That is, the compensation transistor T3 may be turned on when the first scan signal S1 may be a high level, and the compensation transistor T3 may be turned off when the first scan signal S1 may be a low level. When the compensation transistor T3 is a PMOS transistor, the enable level of the first scan signal S1 may be a low level, and the non-enable level of the first scan signal S1 may be a high level. That is, the compensation transistor T3 may be turned on when the first scan signal S1 may be a low level, and the compensation transistor T3 may be turned off when the first scan signal S1 may be a high level.

An NMOS transistor may be turned on when its gate receives a high level signal and may be turned off when its gate receives a low level signal. A PMOS transistor may be turned on when its gate receives a low level signal and may be turned off when its gate receives a high level signal. For the convenience of description, without special limitations, the embodiments where each transistor in the pixel circuit is a PMOS transistor will be used as examples to exemplarily illustrate the present disclosure.

In one optional embodiment, the pixel circuit 10 may further include a reset module 140 which may be used to control the reset signal Vref to be written into the gate of the driving transistor T1 to reset the gate of the driving transistor T, to prevent the potential of the gate of the driving transistor T1 in the previous working cycle from affecting the writing of the data signal Vdata in the next working cycle. At this time, before the data writing stage of the pixel P, a reset stage may also be included, such that the reset module 140 may write the reset signal to the gate of the driving transistor T in the reset stage. That is, the driving cycle of the pixel circuit 10 may at least include a reset stage, a pre-writing stage, a data writing stage and a light-emitting stage. The reset module 140 may be turned on or off under the control of the third scan signal S3, and when the third scan signal S3 is at the enable level, the reset module 140 may be controlled to be turned on such that the reset module 140 transmits the reset signal Vref to the gate of the driving transistor T1.

In one optional embodiment, in the driving cycle of the same pixel P, the pre-writing stage may be located after the reset stage. At this time, the reset stage of the current row of pixels P may overlap with the data writing stage of the previous row of pixels P. The third scan signal S3 received by the reset module 140 of the current row of pixels P may reuse the second scan signal S2 received by the data writing module 120 of the previous row of pixels P, or the third scan signal S3 received by the reset module 140 of the current row of pixels P may reuse the first scan signal S1 received by the compensation module 130 of the previous row of pixels P, thereby facilitating the reduction of the driving circuit for providing the scan signal, facilitating the simplification of the structure of the display panel 100. Also, when the driving circuit is arranged in the non-display area of the display panel 100, it may facilitate the reduction of the size of the display panel 100, thereby facilitating the narrow frame of the display panel.

Optionally, the reset module 140 may include a reset transistor T4. In the same pixel circuit 10, the gate of the reset transistor T4 may receive the third scan signal S3, the first electrode of the reset transistor T4 may receive the reset signal Vref, and the second electrode of the reset transistor T4 may be electrically connected to the gate of the driving transistor T1. Therefore, the reset transistor T4 may be turned on or off under the control of the third scan signal S3, and when the third scan signal S3 is at the enable level, the reset signal Vref may be transmitted to the gate of the driving transistor. The display panel 100 may also include a plurality of third scan lines and a plurality of reset signal lines (not shown in the figure), and the gates of the reset transistors of the pixels P in the same row may be electrically connected to the same third scan line, and the first electrodes of the reset transistors of the pixels P in the same row may be electrically connected to the same reset signal line. The specific implementation method may be designed according to actual needs, and the embodiments of the present disclosure do not specifically limit this.

Optionally, the pixel circuit 10 may further include an initialization module 150 connected to the anode of the light-emitting element 20, such that the anode of the light-emitting element 20 may be initialized and the anode potential of the light-emitting element 20 may be cleared before the light-emitting element 20 emits light to prevent the anode potential of the light-emitting element 20 in the light-emitting stage of the previous driving cycle from affecting the display luminous brightness of the light-emitting element 20 in the current driving cycle. The initialization module 150 may be turned on or off under the control of the fourth scan signal S4. When the fourth scan signal S4 is an enable level, the initialization module 150 may be controlled to be turned on, and the initialization signal Vini may be written to the anode of the light-emitting element 20 through the initialization module 150 to initialize the anode of the light-emitting element 20. When the fourth scan signal S4 is a non-enable level, the initialization module 150 may be controlled to be turned off, and the initialization module 150 may prevent the writing of the initialization signal Vini. The initialization signal Vini may be the same as or different from the reset signal Vref, and the embodiments of the present disclosure do not specifically limit this.

Optionally, the initialization module 150 may include an initialization transistor T5. The gate of which may receive the fourth scan signal S4, the first electrode of the initialization transistor T5 may receive the initialization signal Vini, and the second electrode of the initialization transistor T5 may be electrically connected to the anode of the light-emitting element 20. Therefore, when the fourth scan signal S4 controls the initialization transistor T5 to turn on, the initialization signal Vini may be transmitted to the anode of the light-emitting element 20 to initialize the anode of the light-emitting element 20.

Optionally, since the process of initializing the anode of the light-emitting element 20 by the initialization module 150 may be located before the light-emitting stage of the light-emitting element 20 and the time when the data writing module 120 writes the data signal Vdate to the pixel P may also be located before the light-emitting stage, the fourth scan signal S4 used to control the initialization module 150 to turn on or off may reuse the second scan signal S2 used to control the data writing module 120 to turn on or off, and the specific implementation method may be designed according to actual needs, and the embodiments of the present disclosure do not specifically limit this.

Optionally, the pixel circuit 10 may further include a first light-emitting control module 160 and a second light-emitting control module 170, which may be turned on or off under the control of a light-emitting control signal EM. The first light-emitting control module 160 and the second light-emitting control module 170 may be connected in series with the driving transistor T1 and the light-emitting element 20 between the positive power supply PVDD and the negative power supply PVEE. When the light-emitting control signal EM controls the first light-emitting control module 160 and the second light-emitting control module 170 to be turned on, a current path may be formed between the positive power supply PVDD and the negative power supply PVEE, such that the driving transistor T1 is able to provide the driving current generated by it to the light-emitting element 20 to drive the light-emitting element 20 to emit light. When the light-emitting control signal EM controls the first light-emitting control module 160 and the second light-emitting control module 170 to be turned off, the driving transistor T1 may not be able to provide the driving current to the light-emitting element 20, and the light-emitting element 20 may not emit light.

Optionally, the first light-emitting control module 160 may include a first light-emitting control transistor T6, and the second light-emitting control module 170 may include a second light-emitting control transistor T7. The first electrode of the first light-emitting control transistor T6 may be electrically connected to the positive power supply PVDD, the second electrode of the first light-emitting control transistor T6 may be electrically connected to the first electrode of the driving transistor T1, the second light-emitting control transistor T7 may be electrically connected to the second electrode of the driving transistor T, and the second light-emitting control transistor T7 may be electrically connected to the anode of the light-emitting element 20. The gates of the first light-emitting control transistor T6 and the second light-emitting control transistor T7 may receive the same light-emitting control signal EM. In some special cases, the first light-emitting control transistor T6 and the second light-emitting control transistor T7 may also receive different light-emitting control signals, which can be specifically designed according to actual needs, and the embodiments of the present disclosure do not specifically limit this.

The pixel circuit 10 may further include a storage capacitor Cst electrically connected between the gate of the driving transistor T1 and the positive power supply PVDD to store the gate signal of the driving transistor T1 and ensure that the driving transistor T1 is able to continuously provide the driving current to the light-emitting element 20 during the light-emitting stage.

Figure 21:
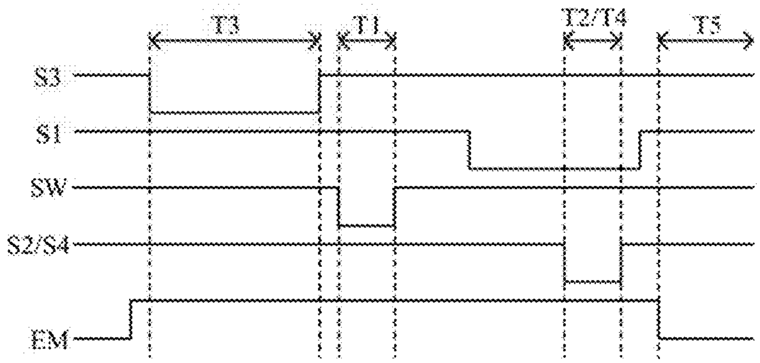
FIG. 21 illustrates a driving timing diagram of a pixel in FIG. 20 consistent with various disclosed embodiments in the present disclosure.

In one embodiment shown in FIG. 21 which is a driving timing diagram of one pixel corresponding to the pixel shown in FIG. 20, taking the pixel P as a first-type pixel as an example, the driving cycle of the pixel P is exemplarily described. As shown in FIG. 9, FIG. 20 and FIG. 21, when the reset module 140 of the pixel P receives the enable level of the third scan signal S3, the initialization stage T3 of the pixel P may be entered, such that the reset module 140 of the pixel P may transmit the reset signal Vini to the gate of its driving transistor T1 to reset the gate of the driving transistor T1. When the switch module 40 corresponding to the data line 11 electrically connected to the pixel P receives the enable level of the switch control signal SW, the pre-writing stage T1 of the pixel P may be entered, such that the data signal Vdata of the pixel P may be written to the data line 11 electrically connected to the pixel P. When the first scan signal S1 received by the compensation module 130 of the pixel P and the second scan signal S2 received by the data writing module 120 are both at the enable level, the pixel P may enter the data writing stage T2, such that the data signal Vdata written to the data line 11 in the pre-writing stage T1 of the pixel P may be written to the gate of the driving transistor T1 through the data writing module 120, the driving transistor T1 and the compensation module 130, and the threshold voltage of the driving transistor T1 may be compensated to the gate of the driving transistor T1. Also, when the fourth scan signal S4 received by the initialization module 150 of the pixel P is at the enable level, the pixel P may enter the initialization stage T4, such that the initialization signal Vini may be transmitted to the anode of the light-emitting element 20 to initialize the anode of the light-emitting element 20. When the light-emitting control signal EM received by the first light-emitting control module 160 and the second light-emitting control module 170 is at the enable level, the pixel P may enter the light-emitting stage T5, such that the driving transistor T1 may provide the driving current to the light-emitting element 20 according to its gate signal to drive the light-emitting element 20 to emit light.

Figure 22:
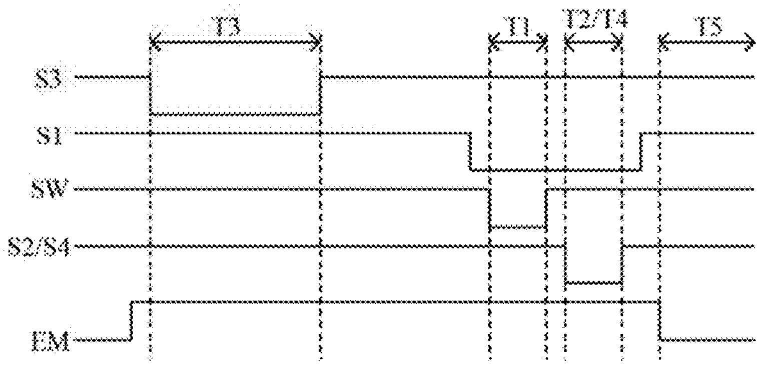
FIG. 22 illustrates another driving timing diagram of a pixel in FIG. 20 consistent with various disclosed embodiments in the present disclosure.

In another exemplary embodiment, as shown in FIG. 20 and FIG. 22, the pixel P may be a first-type pixel, the pre-writing stage T1 of the pixel P may also overlap with the enable level time of the first scan signal S1 received by the compensation module 130 of the pixel P, but not overlap with the enable level time of the second scan signal S2 received by the data writing module 120 of the pixel P.

Figure 23:
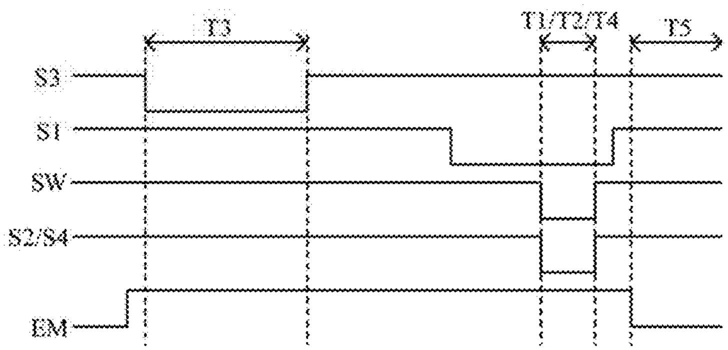
FIG. 23 illustrates another driving timing diagram of a pixel in FIG. 20 consistent with various disclosed embodiments in the present disclosure.

In another exemplary embodiment, as shown in FIG. 20 and FIG. 23, the pixel P may also be a second-type pixel. In this case, the pre-writing stage T1 of the pixel P and the data writing stage T2 of the pixel P may be at the same time period, such that while providing the data signal Vdata to the data line electrically connected to the pixel P, the data signal Vdata on the data line may be written to the gate of the driving transistor T1 of the pixel P.

Figure 24:
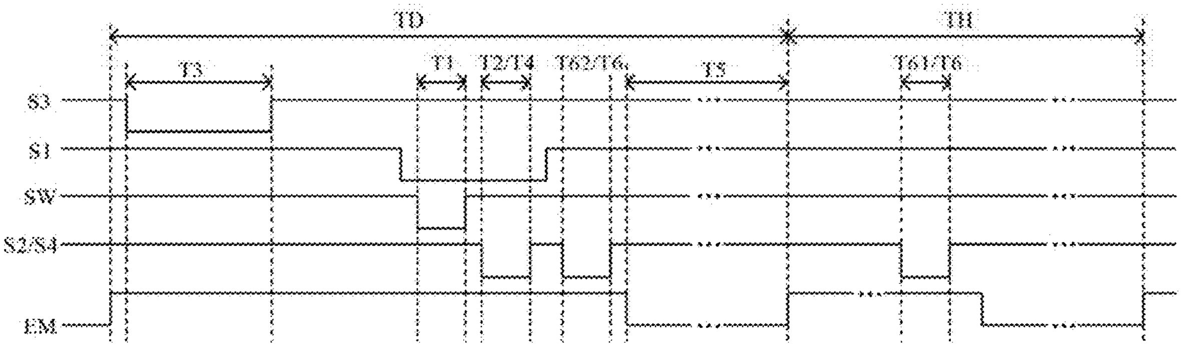
FIG. 24 illustrates another driving timing diagram of a pixel in FIG. 20 consistent with various disclosed embodiments in the present disclosure.

Optionally, in one embodiment shown in FIG. 20 and FIG. 24 which is a driving timing diagram of another pixel corresponding to the pixel shown in FIG. 20, the display time of one frame of the display panel 100 may include a refresh frame TD. The pre-writing stage T1 and the data writing stage T2 may both be located within the refresh frame TD. The driving cycle of the pixel P may also include at least one bias adjustment stage T6. That is, the driving cycle of the pixel P may include one or more bias adjustment stages T6. The data writing module 120 may also be used to control the bias adjustment signal V0 to be written to the drive module 110 in the bias adjustment stage T6. In the first mode, the display time of one frame of the picture may also include at least one hold frame TH. The bias adjustment stage T6 may include a first bias adjustment stage T61. The first bias adjustment stage T61 may be located in the hold frame TH.

The display mode of the display panel may at least include the first mode. The first mode may be a display panel having a lower refresh frequency. In the first mode, the display time of one frame of the display panel may include a refresh frame TD and at least one hold frame TH at the same time. In the refresh frame TD, the switch modules in the multiplexer circuit may be controlled to be turned on in sequence such that the data signal of each pixel P is provided to each data line 11, and the data writing module 120 and the compensation module 130 in each pixel P are controlled to be turned on such that the data signal on each data line 11 is correspondingly written to the gate of the driving transistor T1 of each pixel P. Therefore, when the first light-emitting control module 160 and the second light-emitting control module 170 of each pixel P are controlled to be turned on, the driving transistor T1 may provide the driving current to the light-emitting element 20 according to its gate signal, and drive the light-emitting element 20 to display and emit light. In this way, the refresh frame TD may include a light-emitting stage T5 and a non-light-emitting stage, and the non-light-emitting stage may include at least a reset stage T3, a pre-writing stage T1, a data writing stage T2 and an initialization stage T4. The holding frame TH may also include a light-emitting stage and a non-light-emitting stage. In the non-light-emitting stage of the holding frame TH, the compensation module 130 and the reset module 140 of the pixel circuit 10 may no longer be turned on, such that the gate signal of the driving transistor T1 in the pixel circuit 10 remains unchanged. Because there is a light-emitting stage before the holding frame TH, there may be a certain voltage difference between the gate of the driving transistor T1 and the first and second electrodes, thereby causing a hysteresis phenomenon, causing the threshold voltage of the driving transistor T1 to drift, and affecting the driving current provided by the driving transistor T1 to the light-emitting element 20 in the subsequent light-emitting stage. The display luminous brightness of the light-emitting element 20 may be affected.

In this embodiment, by making the frame TH include the first bias adjustment stage T61, in the first bias adjustment stage T61, the data writing module 120 may be controlled to provide the bias adjustment signal V0 to the driving module 110, such that the bias adjustment signal V0 may be used to bias the driving transistor T1 in the driving module 110, thereby improving the threshold drift caused by the long-term conduction of the driving transistor T1 in the light-emitting stage T5 before the current stage. Therefore, in the subsequent light-emitting stage, the driving transistor T1 may accurately provide the driving current to the light-emitting element 20, drive the light-emitting element 20 to accurately emit light, and thus help to improve the display effect of the display panel.

Optionally, as shown in FIG. 20 and FIG. 24, in one embodiment, the bias adjustment stage may also include a second bias adjustment stage, and the non-luminous stage of the refresh frame TD may include a second bias adjustment stage. The second bias adjustment stage may be located after the data writing stage, that is, the second bias adjustment stage may be entered after the data writing stage, such that the data writing module 120 may provide a bias adjustment signal to the first electrode of the driving transistor. Therefore, when each pixel P enters the luminous stage, the first electrode signal of the driving transistor T1 in the pixel P may remain consistent, thereby preventing the situation where the uniformity of the display luminous brightness of each pixel P is affected by the difference in the first electrode signal of the driving transistor T1 in each pixel P, and helping to improve the overall display uniformity of the display panel.

Since the bias adjustment stage and the data writing stage are different stages, in the data writing stage, the second scan signal S2 may control the data writing transistor T2 in the data writing module 120 to be turned on such that the data signal Vdata on the data line 11 may be written to the gate of the driving transistor T1, and the second scan signal S2 may again control the data writing transistor T2 of the data writing module 120 to be turned on in the bias adjustment stage T6 such that the bias adjustment signal V0 may be written to the first electrode of the driving transistor T1. Correspondingly, the transistors that provide the data signal Vdata and the bias adjustment signal V0 to the driving transistor T1 may be the same data writing transistor.

Figure 25:
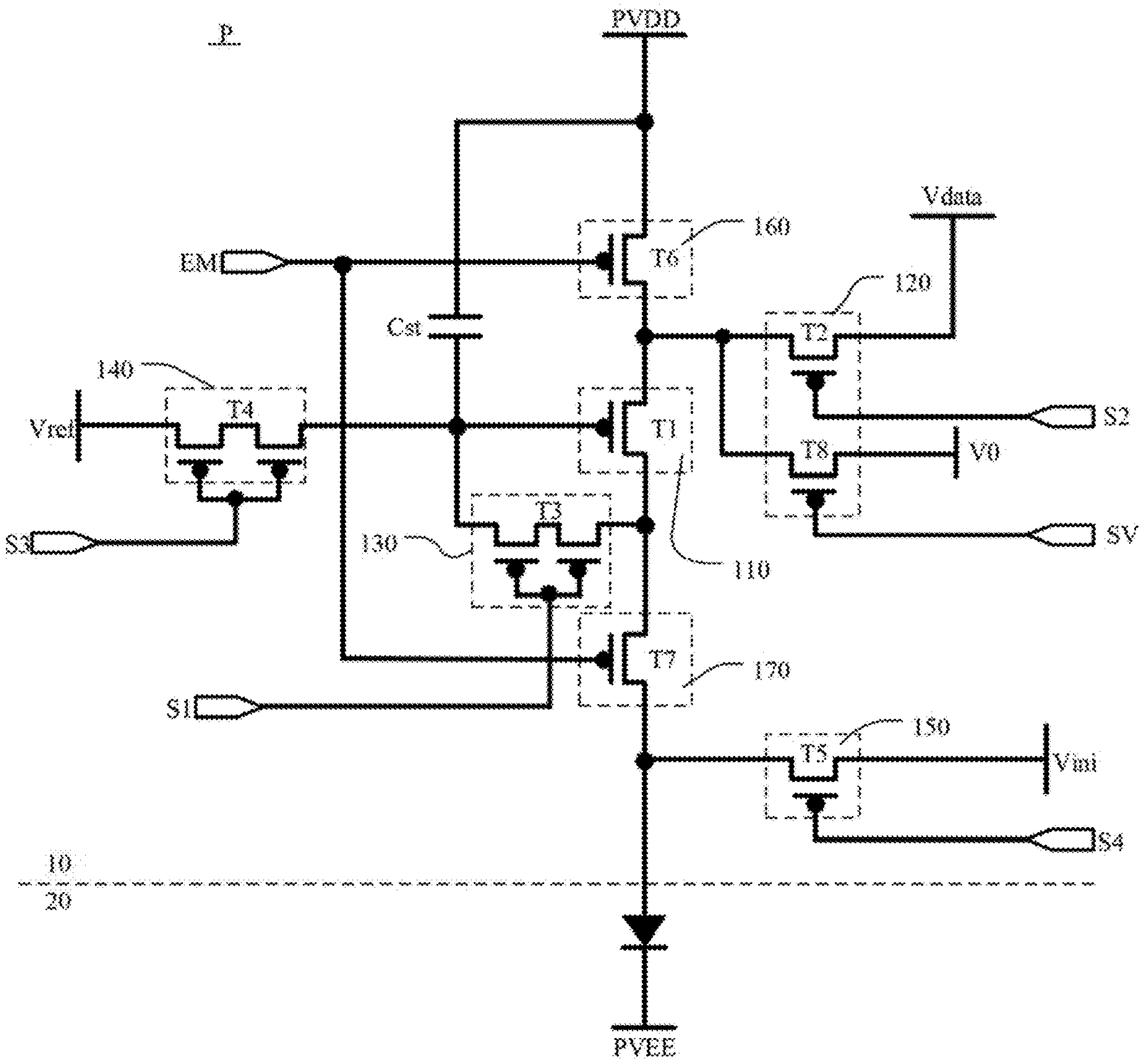
FIG. 25 illustrates another pixel in a display panel consistent with various disclosed embodiments in the present disclosure.
Figure 26:
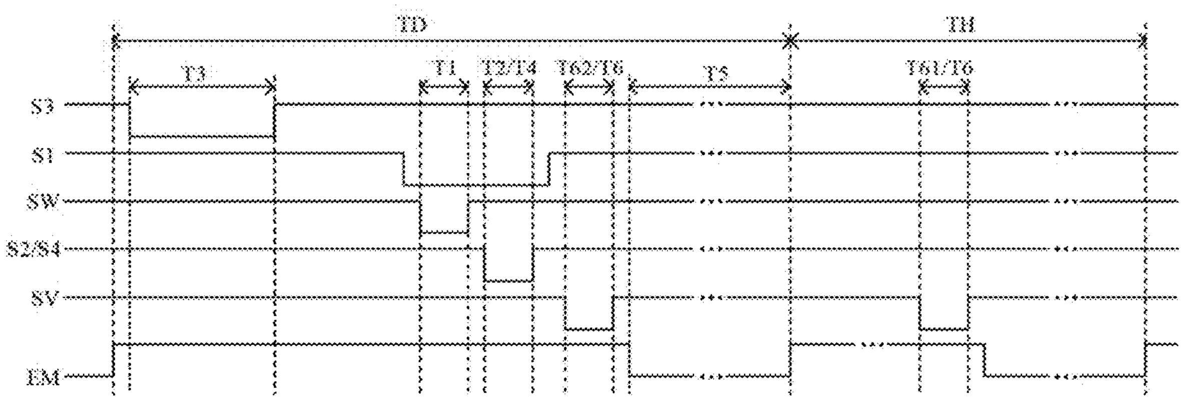
FIG. 26 illustrates a driving timing diagram of a pixel in FIG. 25 consistent with various disclosed embodiments in the present disclosure.

In other optional embodiments of the present disclosure, the transistors providing the data signal Vdata and the bias adjustment signal V0 to the driving transistor T1 may also be different transistors. As shown in FIG. 25 and FIG. 26, the data writing module 120 may also include a bias adjustment transistor T8. The gate of the bias adjustment transistor T8 may receive the bias adjustment control signal SV, the first electrode of the bias adjustment transistor T8 may receive the bias adjustment signal V0, and the second electrode of the bias adjustment transistor T8 may be electrically connected to the first electrode of the driving transistor T1. Therefore, in the bias adjustment stage T6, the bias adjustment control signal SV may control the bias adjustment transistor T8 to turn on, and in other stages, the bias adjustment transistor T8 may be turned off, such that the bias adjustment signal V0 may be provided to the first electrode of the driving transistor T1 in the bias adjustment stage T6 to bias the driving transistor T1.

The above driving cycle of the pixel P is used as an example to illustrate the present disclosure only, and does not limit the scope of the present disclosure. The driving cycle of the pixel P may be configured according to actual needs, with reference to existing technologies.

Optionally, as shown in FIG. 19, in one embodiment, in the display panel 100, the pixel rows may include first-type pixel rows and/or second-type pixel rows. The non-enable level time of the first scan signal transmitted by each first scan line 21 may cover the pre-writing stage of each pixel P in one corresponding first-type pixel row. There may be at least one first scan line 21 transmitting a first scan signal whose enable level time covers the pre-writing stage of each pixel P in the second-type pixel row.

Figure 27:
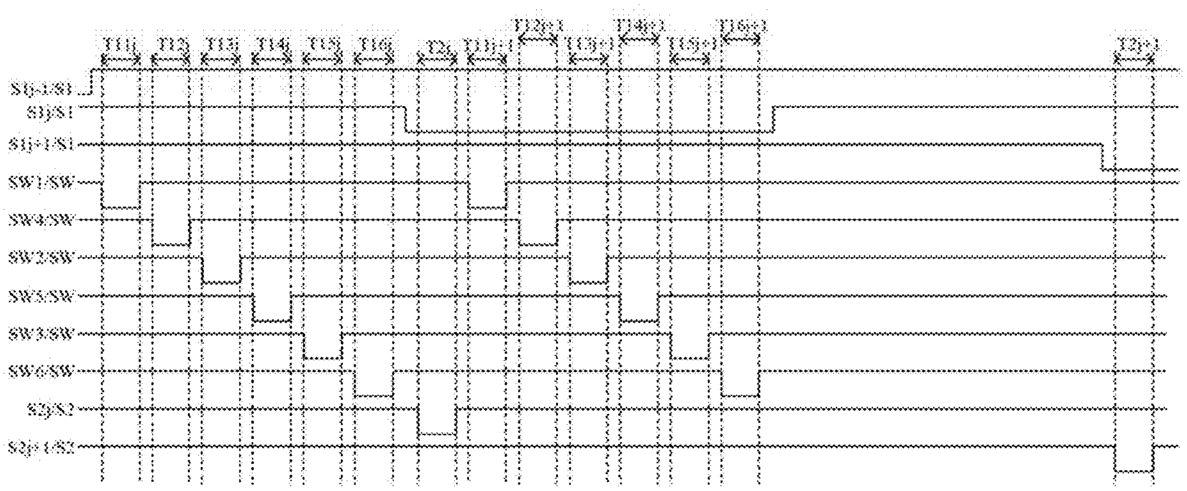
FIG. 27 illustrates a driving timing diagram of another display panel consistent with various disclosed embodiments in the present disclosure.

Exemplarily, in one embodiment shown in FIG. 27 which is a driving timing diagram of another display panel and FIG. 19, taking the pixel row 10*j* as one first-type pixel row and the pixel row 10*j*+1 as one second-type pixel row as an example, the pre-writing stages (T11*j*, T12*j*, T13*j*, T14*j*, T15*j*, T16*j*) of each pixel P in the first type pixel row 10*j* may overlap with the non-enable level time of the first scan signal S1*j* transmitted by the first scan line 21 electrically connected to the first-type pixel row 10*j*, and the non-enable level time of the first scan signals S1 (S1*j*−1, S1*j*+1) transmitted by other first scan lines 21. At this time, in the first-type pixel row 10*j*, 0*j*, the data signal Vdata of each pixel P in the first-type pixel row 10*j* may be written to each data line 11 in sequence. After the pre-writing stage (T11*j*, T12*j*, T13*j*, T14*j*, T15*j*, T16*j*) of each pixel P in the first-type pixel row 10*j* is completed, the first scan signal S1*j* and the second scan signal S2*j* received by the pixel P may jump to the enable level, thereby entering the data writing stage T2*j* of each pixel P in the first-type pixel row 10*j* and the data signal on each data line 11 may be written into each pixel P in the first-type pixel row 10*j*. Therefore, the pre-writing stage and the data writing stage of each pixel P in the first-type pixel row 10*j* may be performed in a time-sharing manner, and the pre-writing stage of each pixel P in the first-type pixel row 10*j* may be located before the first scan signal S1*j* received by it jumps to the enable level, such that the signal written to each pixel P in each first-type pixel row 10*j* in the data stage of each pixel P in the first-type pixel row 10*j* is the sum of its respective data signal and the coupling signal. Therefore, in the light-emitting stage of each pixel P in the first-type pixel row 10*j*, the change in the light-emitting brightness of each pixel P may remain consistent, thereby improving or eliminating the display vertical stripes and improving the display effect of the display panel.

Similarly, the pre-writing stages (T11*j*, T12*j*, T13*j*, T14*j*, T15*j*, T16*j*) of each pixel P in the second-type pixel row 10*j*+1 may overlap with the enable level time of the first scan signal S1*j* transmitted by the first scan line 21 electrically connected to the first-type pixel row 10*j*. The data signal Vdata of each pixel P in the first-type pixel row 10*j* may be written to each data line 11 in sequence in the pre-writing stages (T11*j*, T12*j*, T13*j*, T14*j*, T15*j*, T16*j*) of each pixel P in the second-type pixel row 10*j*+1. After the pre-writing stage (T11*j*, T12*j*, T13*j*, T14*j*, T15*j*, T16*j*) of each pixel P in the second-type pixel row 10*j*+1 is completed, the first scan signal S1*j* and the second scan signal S2*j* received by each pixel P in the first-type pixel row 10*j* may jump to the non-enable level, and after a period, the first scan signal S1*j*+1 and the second scan signal S2*j*+1 received by each pixel P in the second-type pixel row 10*j*+1 may jump to the enable level, thereby entering the data writing stage T2*j*+1 of each pixel P in the second-type pixel row 10*j*+1 and the data signal on each data line 11 may be written into each pixel P in the second-type pixel row 10*j*+1. Therefore, the change of the data signal written to each pixel P in each second-type pixel row 10*j*+1 in the pre-writing state and the data stage of each pixel P in the second-type pixel row 10*j*+1 may remain consistent, thereby improving or eliminating the display vertical stripes and improving the display effect of the display panel.

Figure 28:
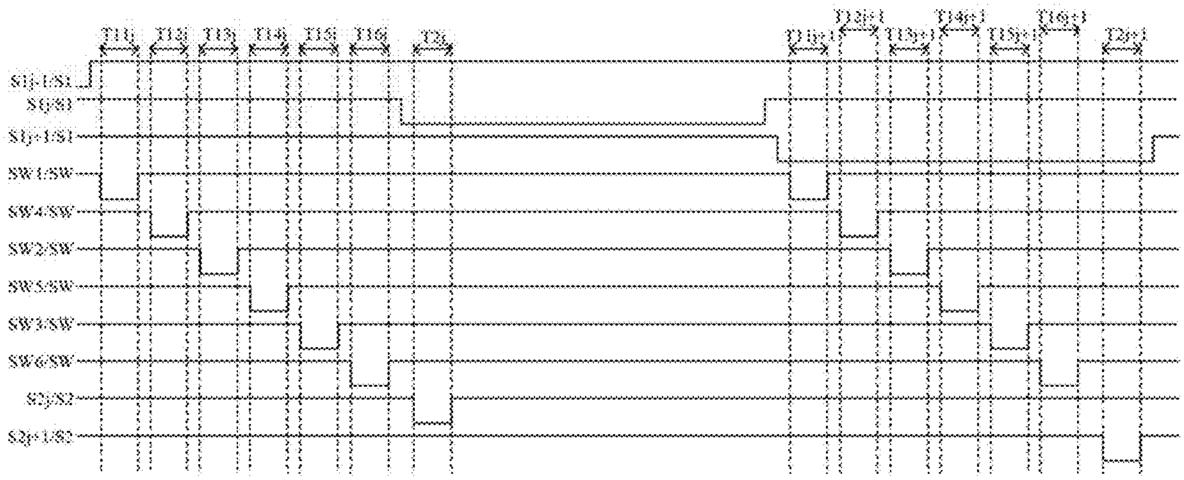
FIG. 28 illustrates a driving timing diagram of another display panel consistent with various disclosed embodiments in the present disclosure.

The above description is merely an example to exemplify the overlap of the pre-writing stage of each pixel P in the second-type pixel row 10*j*+1 with the enable level time of the first scan signal S1*j* received by each pixel P in the first-type pixel row 10*j*, and does not limit the scope of the present disclosure. In another embodiment of the present disclosure, as shown in FIG. 28, the pre-writing stage of each pixel P in the second-type pixel row 10*j*+1 may also overlap with the enable level time of the first scan signal S1*j*+1 received by each pixel P in the second-type pixel row 10*j*+1. On the premise that the core inventive point of the embodiments of the present disclosure can be realized, the embodiments of the present disclosure do not make any specific limitation on this.

Figure 29:
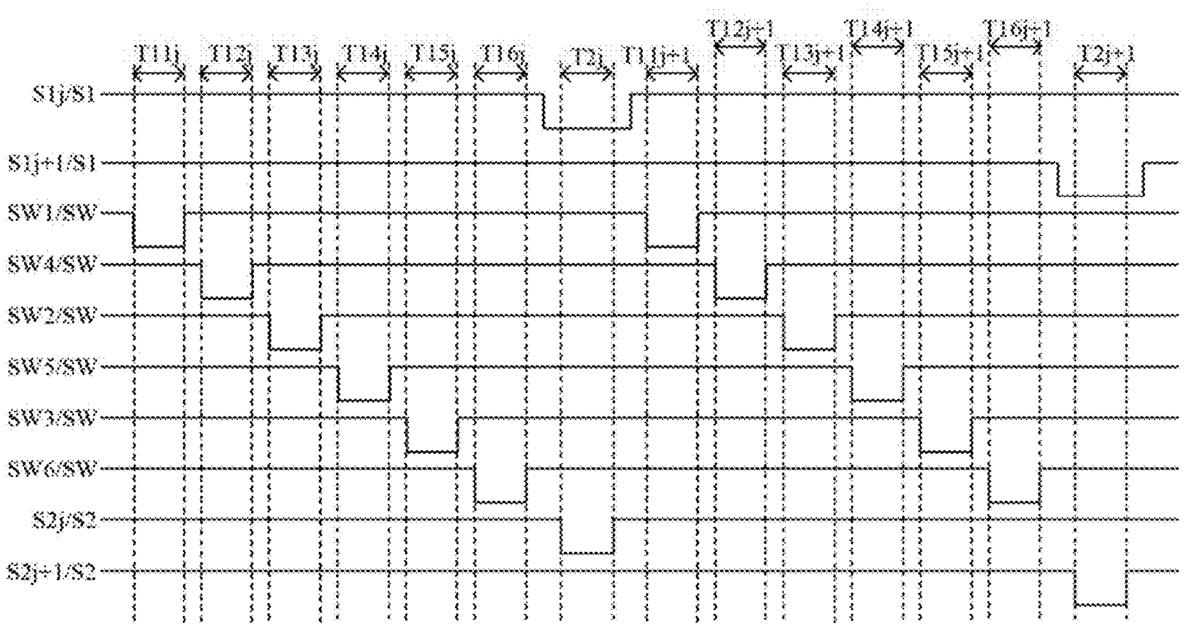
FIG. 29 illustrates a driving timing diagram of another display panel consistent with various disclosed embodiments in the present disclosure.
Figure 30:
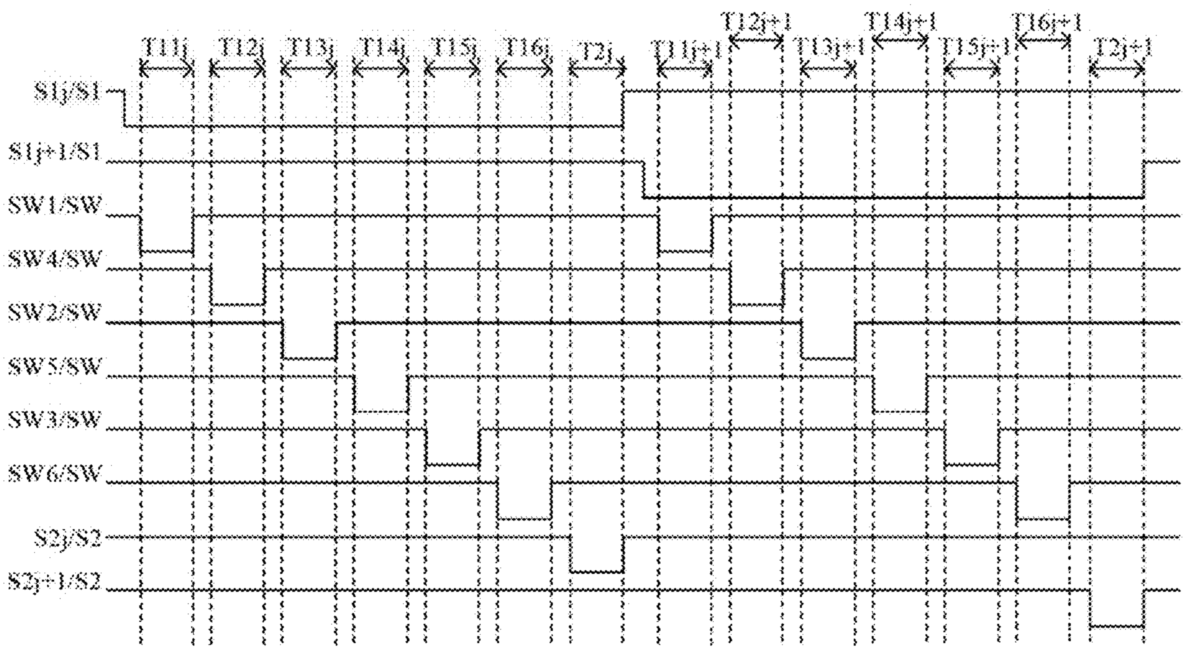
FIG. 30 illustrates a driving timing diagram of another display panel consistent with various disclosed embodiments in the present disclosure.

The above description is only illustrative of the case where the pixel rows in the display panel 100 include both the first-type pixel rows and the second-type pixel rows. In another embodiment of the present disclosure, as shown in FIG. 29, all pixel rows in the display panel may be first-type pixel rows. In this case, the pre-writing stage of each pixel in the same pixel row may be located before the enable level time of the first scan signal S1 received by it. In yet another embodiment shown in FIG. 30, all pixel rows in the display panel may be second-type pixel rows. In this case, the pre-writing stage of each pixel in the same pixel row may overlap with the enable level time of the first scan signal S1 received by it. Therefore, the difference between the signal received by each pixel P in the display panel in its respective data writing stage and the data signal provided to the data line in its respective pre-writing stage may be consistent, thereby improving or eliminating the overall display vertical stripes of the display panel and improving the display effect of the display panel.

The type of each pixel row in the display panel may be designed according to actual needs. The embodiments of the present disclosure do not make any specific limitation on this. For the convenience of description, without special limitations, the embodiments where any two adjacent pixel rows are one first-type pixel row and one second-type pixel row respectively as an example will be used as examples to exemplify the present disclosure.

Figure 31:
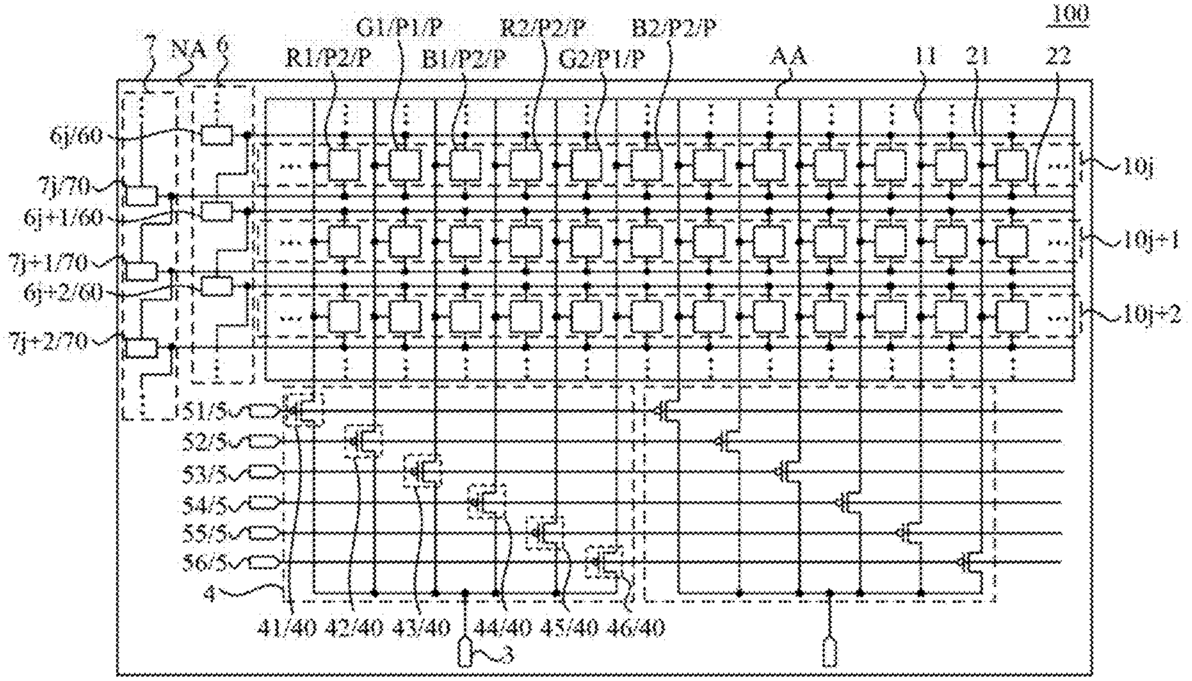
FIG. 31 illustrates another exemplary display panel consistent with various disclosed embodiments in the present disclosure.

In one embodiment shown in FIG. 31 which is a structural schematic diagram of another display panel, the display panel 100 may also include a first driving circuit 6 and a second driving circuit 7. The first driving circuit 6 may include a plurality of cascaded first driving units 60, and a first driving unit 60 at each level may sequentially output the enable level of the first scan signal S1. The first driving units 62 at each level may be respectively electrically connected to one corresponding first scan line 21. The second driving circuit 7 may include a plurality of cascaded second driving units 70, and the second driving unit 70 at each level may sequentially output the enable level of the second scan signal S2. The second driving unit 70 at each level may be respectively electrically connected to one corresponding second scan line 22.

The first driving units 60 of each level may be respectively electrically connected to one corresponding first scan line 21, that is, the first driving units 60 of each level may be respectively electrically connected to each first scan line 21 in a one-to-one correspondence, that is, each first driving unit 60 of each level is electrically connected to one first scan line 21. For example, the j-th first driving unit 6*j* may be electrically connected to the first scan line 21 corresponding to each pixel P in the j-th pixel row 10*j*, the (j+1)-th first driving unit 6*j*+1 may be electrically connected to the first scan line 21 corresponding to each pixel P in the (j+1)-th pixel row 10*j*+1, and the (j+2)-th first driving unit 6*j*+2 may be electrically connected to the first scan line 21 corresponding to each pixel P in the (j+2)-th pixel row 10*j*+2. Therefore, the first driving units 60 of each level may provide the first scan signal S1 to each first scan line 21 respectively. The enable level time of the first scan signal S1 received by each first scan line 21 may be shifted in sequence. For example, the enable level time of the first scan signal S1*j* received by the first scan line 21 electrically connected to the first driving unit 6*j* of the j-th level may be located before the enable level time of the first scan signal S1*j*+1 received by the first scan line 21 electrically connected to the (j+1)-th first driving unit 6*j*+1. In this way, the turn-on time of the compensation module of each pixel P in the j-th pixel row 10*j* may be located before the turn-on time of the compensation module of each pixel P in the (j+1)-th pixel row 10*j*+1, such that the data writing stage of each pixel P in the j-th pixel row 10*j* may be located before the data writing stage of each pixel P in the (j+1)-th pixel row 10*j*+1, thereby ensuring that the data signals of each row of pixels P are written in a time-sharing manner and ensuring the accuracy of the data writing of each row of pixels P.

The second driving units 70 of each level may be respectively electrically connected to one corresponding second scan line 22, that is, the second driving units 70 of each level may be respectively electrically connected to each second scan line 22 in a one-to-one correspondence, that is, each second driving unit 70 of each level is electrically connected to one second scan line 22. For example, the j-th second driving unit 7*j* may be electrically connected to the second scan line 22 corresponding to each pixel P in the j-th pixel row 10*j*, the (j+1)-th second driving unit 7*j*+1 may be electrically connected to the second scan line 22 corresponding to each pixel P in the (j+1)-th pixel row 10*j*+1, and the (j+2)-th second driving unit 7*j*+2 may be electrically connected to the second scan line 22 corresponding to each pixel P in the (j+2)-th pixel row 10*j*+2. Therefore, the second driving unit 70 of each level may provide the second scan signal S2 to each second scan line 22 respectively. The enable level time of the second scan signal S2 received by each second scan line 22 may be shifted in sequence. For example, the enable level time of the second scan signal S2*j* received by the second scan line 22 electrically connected to the second driving unit 7*j* of the j-th level may be located before the enable level time of the second scan signal S2*j*+1 received by the second scan line 22 electrically connected to the (j+1)-th second driving unit 7*j*+1. In this way, the turn-on time of the data writing module of each pixel P in the j-th pixel row 10*j* may be located before the turn-on time of the data writing module of each pixel P in the (j+1)-th pixel row 10*j*+1, such that the data writing stage of each pixel P in the j-th pixel row 10*j* may be located before the data writing stage of each pixel P in the (j+1)-th pixel row 10*j*+1, thereby ensuring that the data signals of each row of pixels P are written in a time-sharing manner and ensuring the accuracy of the data writing of each row of pixels P.

Figure 32:
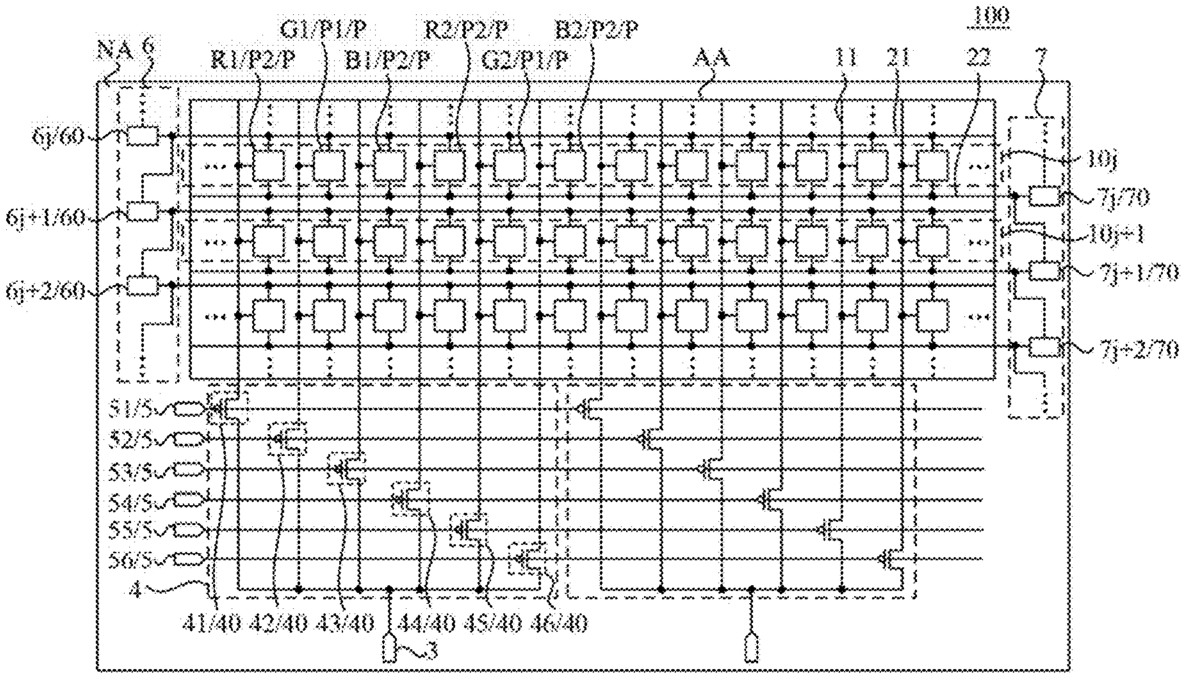
FIG. 32 illustrates another exemplary display panel consistent with various disclosed embodiments in the present disclosure.

In one embodiment, the display panel 100 may include a display area AA and a non-display area NA. The embodiment shown in FIG. 31 where the first driving circuit 6 and the second driving circuit 7 are located in the non-display area NA on one side of the display area AA is used as an example only to illustrate the present disclosure, and does not limit the scope of the present disclosure. In some other embodiments of the present disclosure, as shown in FIG. 32, the first driving circuit 6 and the second driving circuit 7 may also be respectively located in the non-display area NA on the two opposite sides of the display area AA. The specific implementation method may be designed according to actual needs, and the embodiments of the present disclosure do not make specific limitations on this. For the convenience of description, without special limitations, the embodiments where the first driving circuit 6 and the second driving circuit 7 are half located in the non-display area NA on the two opposite sides of the display area AA will be used as examples to illustrate the present disclosure.

In other optional embodiments, the first driving unit at each level may be electrically connected to the first scan lines respectively, which may also be understood as that each level of the first driving units may be electrically connected to at least two first scan lines. Similarly, the second driving unit at each level may be electrically connected to the second scan lines respectively, which may also be understood as that each level of the second driving unit may be electrically connected to at least two second scan lines. The number of first scan lines electrically connected to the first driving unit at each level may be the same as or different from the number of second scan lines electrically connected to the second driving unit at each level, and the embodiments of the present disclosure do not specifically limit this.

Figure 33:
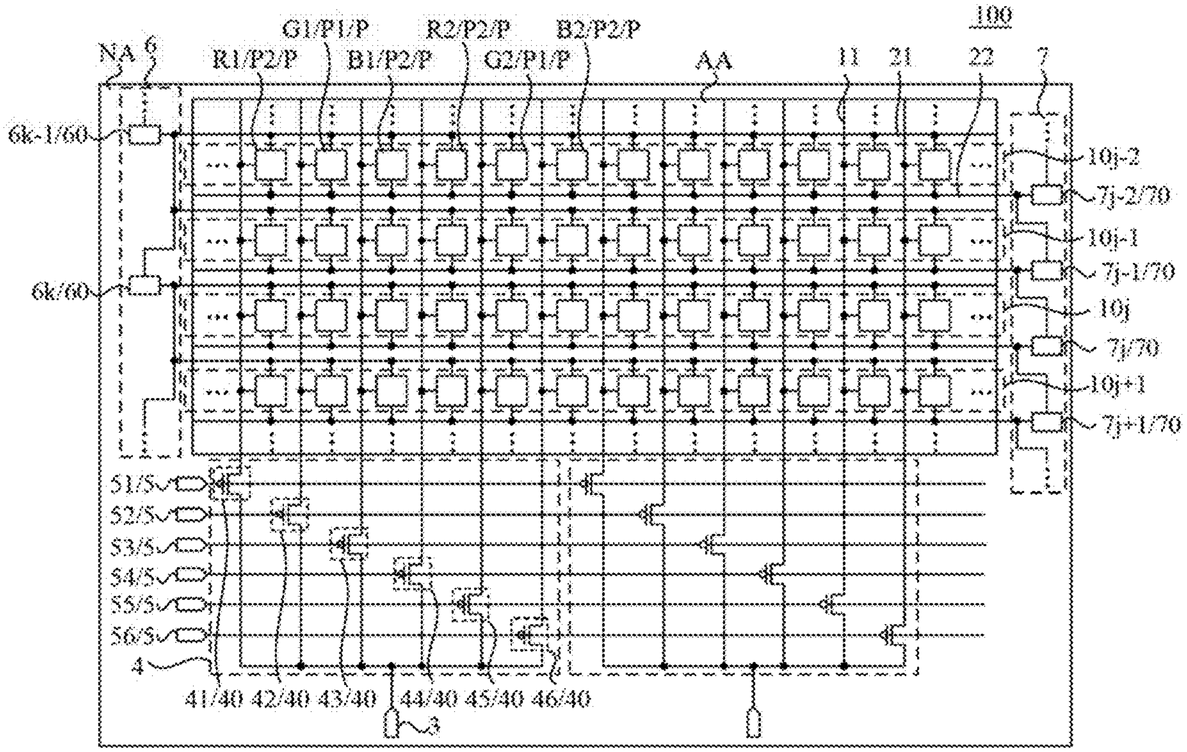
FIG. 33 illustrates another exemplary display panel consistent with various disclosed embodiments in the present disclosure.

Exemplarily, in another embodiment, as shown in FIG. 33, each level of the first driving unit 60 may be electrically connected to two adjacent first scan lines 21, such that the first scan signal S1 received by each pixel in the pixel row electrically connected to the two adjacent first scan lines 21 is the same. For example, the (k−1)-th-level first driving unit 6*k*−1 may be electrically connected to the two first scan lines 21 corresponding to each pixel P in the (j−2)-th pixel row 10*j*−2 and the (j−1)-th pixel row 10*j*−1, and the k-th-level first driving unit 6*k* may be electrically connected to the two first scan lines 21 corresponding to each pixel P in the j-th pixel row 10*j* and the (j+1)-th pixel row 10*j*+1. Each level of the second driving unit 70 may be electrically connected to one second scan line 22. For example, the (j−2)-th-level second driving unit 7*j*−2 may be electrically connected to the second scan line 22 electrically connected to each pixel P in the (j−2)-th pixel row 10*j*−2, the j-th-level second driving unit 7*j* may be electrically connected to the second scan line 22 electrically connected to each pixel P in the j-th pixel row, the (j+1)-th-level second driving unit 7*j*+1 may be electrically connected to the second scan line 22 electrically connected to each pixel P in the (j+1)-th pixel row, and the (j+2)-th-level second driving unit 7*j*+2 may be electrically connected to the second scan line 22 electrically connected to each pixel P in the (j+2)-th pixel row 10*j*+2. Therefore, each level of the first driving unit 60 may provide the first scan signal S1 to each pixel P in two adjacent pixel rows, and each level of the second driving unit 70 may provide the second scan signal S2 to each pixel P in each pixel row. To enable each pixel P in each pixel row to accurately write the data signal, the enable level time of the first scan signal S1 output by each level of the first driving unit 60 may cover the enable level time of the second scan signal S2 output by the two adjacent levels of the second driving units 70, such that the compensation modules of each pixel P in the two adjacent pixel rows may be turned on at the same time and the data writing modules of each pixel P in each pixel row may be turned on in a time-sharing manner. At this time, each pixel row may also enter the data writing stage in a time-sharing manner, ensuring that the data signal of each pixel P in each pixel row is accurately written.

The combination of the first driving unit 60 of each level in the first driving circuit 6 may be the same or different from the structure of the second driving unit 70 of each level in the second driving circuit 7. Under the premise of being able to meet the core invention points of the embodiments of the present disclosure, the embodiments of the present disclosure do not specifically limit this.

Figure 34:
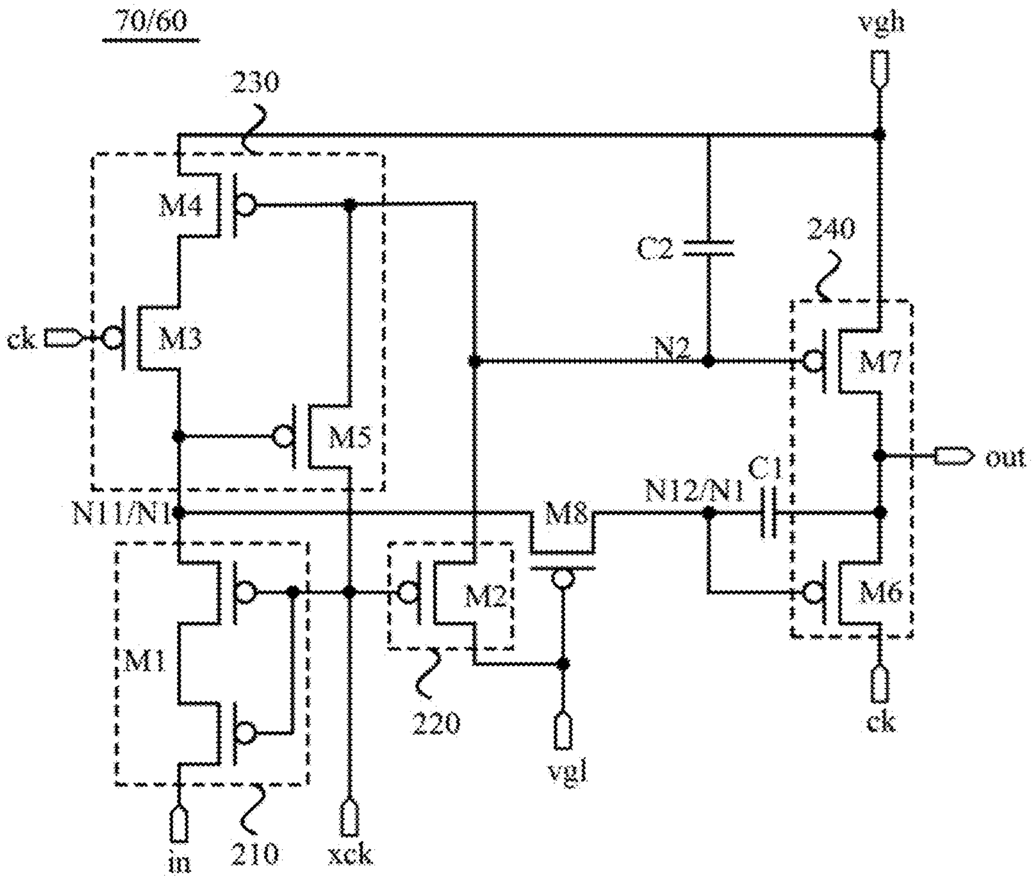
FIG. 34 illustrates an exemplary driving unit consistent with various disclosed embodiments in the present disclosure.

Optionally, in one embodiment shown in FIG. 34 which is a schematic diagram of the structure of a driving unit and FIG. 33, taking the structure of the first driving unit 60 as the same as the structure of the second driving unit 70 as an example, the first driving unit 60 and the second driving unit 70 may both include a first clock terminal ck. The first clock terminal ck of the first driving unit 60 may receive the first clock signal CK1, and the first clock terminal ck of the second driving unit 70 may receive the second clock signal CK2. The effective pulse width of the first clock signal CK1 may be larger than the effective pulse width of the second clock signal CK2.

The effective pulse time of the first clock signal CK1 received by the first clock terminal ck of the first driving unit 60 may control the enable level time of the first scan signal S1 output by the first driving unit 60, and the second clock signal CK2 received by the first clock terminal ck of the second driving unit 70 may control the enable level time of the second scan signal S2 output by the second driving unit 70. By setting the effective pulse width of the first clock signal CK1 received by the first driving unit 60 to be larger than the effective pulse width of the second clock signal CK2 received by the second driving unit 70, when each level of the first driving unit 60 provides the first scan signal S1 to at least two adjacent first scan lines 21 and each level of the second driving unit 70 provides the second scan signal S2 to one second scan line 22, it may be ensured that the enable level time of the first scan signal S1 output by the first driving unit 60 covers the enable level time of the second scan signal S2 output by at least two adjacent levels of the second driving unit 70, thereby meeting the requirement of accurately writing data signals to each pixel P in each pixel row.

In one optional embodiment, as shown in FIG. 34, the first driving unit 60 and the second driving unit 70 may both further include a second clock terminal xck, a first level signal terminal vgl, a second level signal terminal vgh, a signal input terminal in, a signal output terminal out, an input module 210, a reset module 220, a node mutual control module 230 and an output module 240. For one same driving unit, that is, one same first driving unit 60 or one same second driving unit 70, the input module 210 may be electrically connected to the second clock terminal xck, the signal input terminal in and the first node N1, respectively. The input module 210 may be used to control the signal of the first node N1 according to the input signal of the signal input terminal in and the clock signal (third clock signal XCK1, fourth clock signal XCK2) of the second clock terminal xck. The reset module 220 may be electrically connected to the second clock terminal xck, the first level signal terminal vgl and the second node N2, respectively. The reset module 220 may be used to control the second node N2 according to the clock signal (third clock signal XCK1 or fourth clock signal XCK2) of the second clock terminal xck and the first level signal of the first level signal terminal vgl. The node mutual control module 230 may be respectively connected to the first clock terminal ck, the second clock terminal xck, the first node N1, the second node N2 and the second level signal terminal vgh. The node mutual control module 230 may be used to control the signal of the first node N1 according to the signal of the second node N2, the clock signal of the first clock terminal ck (the first clock signal CK1 or the second clock signal CK2) and the second level signal of the second level signal terminal vgh, and control the signal of the second node N2 according to the signal of the first node N1 and the clock signal of the second clock terminal xck (the third clock signal XCK1 or the fourth clock signal XCK2). The output module 240 may be respectively electrically connected to the first node N1, the second node N2, the first clock terminal ck, the second level signal terminal vgh and the signal output terminal out. The output module 240 may be used to control the scan signal (the first scan signal S1 or the second scan signal S2) output by the signal output terminal out according to the signal of the first node N1, the signal of the second node N2, the clock signal of the first clock terminal ck (the first clock signal CK1 or the second clock signal CK2), and the second level signal of the second level signal terminal vgh.

Optionally, the input module 210 may include an input transistor M1. The gate of the input transistor may be electrically connected to the second clock terminal xck, the first electrode of the input transistor may be electrically connected to the signal input terminal in, and the second electrode of the input transistor may be electrically connected to the first node N1. The input transistor M1 may be turned on or off under the control of the clock signal (the third clock signal XCK1 or the fourth clock signal XCK2) of the second clock terminal xck, and when the clock signal (the third clock signal XCK1 or the fourth clock signal XCK2) of the second clock terminal xck controls the input transistor M1 to be turned on, the input signal of the signal input terminal in may be transmitted to the first node N1, to achieve controlling the signal of the first node N1.

The reset module 220 may include a reset control transistor M2. The gate of reset control transistor M2 may be electrically connected to the second clock terminal xck, the first electrode of reset control transistor may be electrically connected to the first level signal terminal vgl, and the second electrode of reset control transistor may be electrically connected to the second node N2. The reset control transistor M2 may be turned on or off under the control of the clock signal (the third clock signal XCK1 or the fourth clock signal XCK2) of the second clock terminal xck, and when the reset control transistor M2 may be turned on by the clock signal (the third clock signal XCK1 or the fourth clock signal XCK2) of the second clock terminal xck, the first level signal of the first level signal terminal vgl may be transmitted to the second node N2, to control the signal of the second node N2.

The node mutual control module 230 may include a first mutual control transistor M3, a second mutual control transistor M4 and a third control transistor M5. The gate of the first mutual control transistor M3 may be electrically connected to the first clock terminal ck, the first electrode of the first mutual control transistor M2 may be electrically connected to the first stage, and the second electrode of the first mutual control transistor may be electrically connected to the first electrode of the second mutual control transistor M4. The second electrode of the second mutual control transistor M4 may be electrically connected to the second level signal terminal vgh, and the gate of the second mutual control transistor M4 may be electrically connected to the second node N2. The gate of the third mutual control transistor M5 may be electrically connected to the first node, the first electrode of the third mutual control transistor M5 may be electrically connected to the second clock terminal xck, and the second electrode of the third mutual control transistor M5 may be electrically connected to the second node N2. The first mutual control transistor M3 may be turned on or off under the control of the clock signal of the first clock terminal ck (the first clock signal CK1 or the second clock signal CK2), the second mutual-controlled transistor M4 may be turned on or off under the control of the signal of the second node N2. When the first mutual-controlled transistor M3 and the second mutual-controlled transistor M4 may be turned on at the same time, the second level signal of the second level signal terminal vgh may be transmitted to the first node N1 to control the signal of the first node N1. The third mutual-controlled transistor M5 may be turned on or off under the control of the signal of the first node N1, and when the third mutual-controlled transistor M5 may be turned on, the clock signal of the second clock terminal xck (the third clock signal XCK1 or the fourth clock signal XCK2) may be transmitted to the second node N2 to control the signal of the second node N2.

The output module 240 may include a first output transistor M6 and a second output transistor M7. The gate of the first output transistor M6 may be electrically connected to the first node N1, the first electrode of the first output transistor M6 may be electrically connected to the first clock terminal ck, and the second electrode of the first output transistor M6 may be electrically connected to the signal output terminal out. The gate of the second output transistor M7 may be electrically connected to the second node N2, the first electrode of the second output transistor M7 may be electrically connected to the second level signal terminal vgh, and the second electrode of the second output transistor M7 may be electrically connected to the signal output terminal out. The first output transistor M6 may be turned on or off under the control of the signal of the first node N1, and may transmit the clock signal (the first clock signal CK1 or the second clock signal CK2) of the first clock terminal ck to the signal output terminal out when the first output transistor M6 is turned on. The second output transistor M7 may be turned on or off under the control of the signal of the second node N2, and may transmit the second level signal of the second level signal terminal vgh to the signal output terminal out when the second output transistor M7 is turned on. Therefore, by setting the first output transistor M6 and the second output transistor M7, the signal of the signal output terminal out may be controlled to switch between the enable level and the non-enable level.

The first driving unit 60 and the second driving unit 70 may also both include a voltage-stabilizing transistor M8, which divides the first node N1 into a first first-node N11 and a second first-node N12. The gate of the voltage-stabilizing transistor M8 may be electrically connected to the first level signal terminal vgl, the first electrode of the voltage-stabilizing transistor M8 may be electrically connected to the first first-node N11, and the second electrode of the voltage-stabilizing transistor M8 may be electrically connected to the second first-node N12. The input module 210 may be electrically connected to the first first-node N11, and the output module 240 may be electrically connected to the second first-node N12. The voltage-stabilizing transistor M8 may stabilize the potential of the first first-node N11 and the second first-node N12 to prevent sudden changes in the two from affecting the working state and service life of the corresponding devices, thereby improving the working stability of the display panel.

The first driving unit 60 and the second driving unit 70 may also each include a bootstrap capacitor C1 which may be electrically connected between the first node N1 and the signal output terminal out, such that when the signal at the signal output terminal out changes, the change amount may be coupled to the first node N1 and the first output transistor M6 electrically connected to the first node N1 may be quickly turned on to quickly output the first clock terminal ck (the first clock signal CK1 or the second clock signal CK2) to the signal output terminal out.

The first driving unit 60 and the second driving unit 70 may also each include a holding capacitor C2 which may be electrically connected between the second node N2 and the second level signal terminal vgh, and the holding capacitor C2 may maintain the signal at the second node N2, such that the signal at the second node N2 may accurately control the second output transistor M7 to be turned on or off.

For each level of the first driving unit in the first driving circuit, the signal input end of the first driving unit may receive the first start signal, and starting from the second level of the first driving unit, the signal input end of each level of the first driving unit may be electrically connected to the signal output end of the first driving unit of the previous level. That is, the input signal of the signal input end of the k-th level of the first driving unit may multiplex the first scan signal output by the signal output end of the (k−1)-th level of the first driving unit. Correspondingly, for each level of the second driving unit in the second driving circuit, the signal input end of the first level of the second driving unit may receive the second start signal, and starting from the second level of the second driving unit, the signal input end of each level of the second driving unit may be electrically connected to the signal output end of the second driving unit of the previous level, that is, the input signal of the signal input end of the j-th level of the second driving unit may multiplex the second scan signal output by the signal output end of the (j−1)-th level of the second driving unit.

In one embodiment, for the structural schematic diagram of the driving unit shown in FIG. 34, the enable level time of the clock signal of the first clock terminal ck and the second clock terminal xck of the same driving unit may not overlap. Also, when the input signal of the signal input terminal in of the current-level driving unit is multiplexed with the scan signal outputted by the signal output terminal out of the previous-level driving unit, the clock signal received by the first clock terminal ck of the current-level driving unit may be multiplexed as the clock signal of the second clock terminal xck of the previous-level driving unit, and the clock signal received by the second clock terminal xck of the previous-level driving unit may be multiplexed as the clock signal of the first clock terminal ck of the previous-level driving unit, to ensure that the enable level time of the scan signal outputted by the driving units of each level of the same driving circuit is shifted sequentially.

Figure 35:
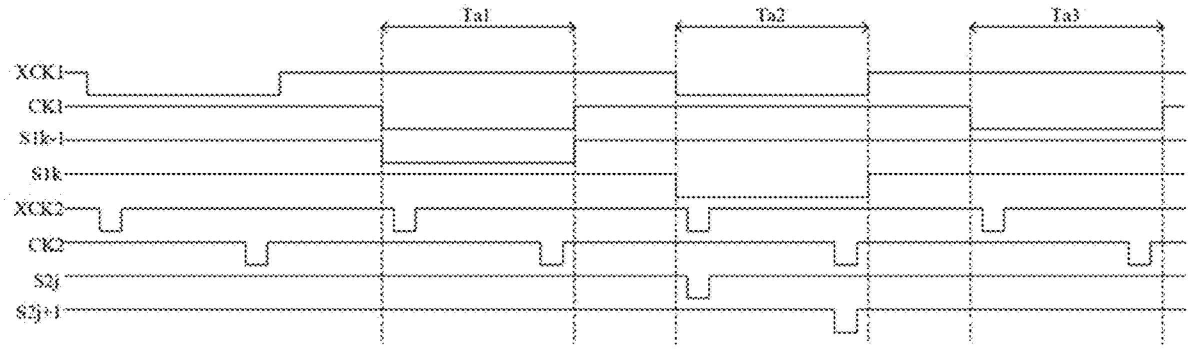
FIG. 35 illustrates a driving timing diagram of an exemplary driving unit consistent with various disclosed embodiments in the present disclosure.

In one embodiment shown in FIG. 34 and FIG. 35 which is a driving timing diagram of a driving unit, when the enable level time of the first scan signal S1*k* output by the k-th first driving unit needs to cover the enable level time of the second scan signal S2*j* output by the j-th second driving unit and the enable level time of the second scan signal S2*j*+1 output by the (j+1)-th second driving unit, the effective pulse time of the first clock signal CK1 received by the first clock end ck of the k-th first driving unit may need to simultaneously cover the second clock signal CK2 received by the first clock end of the j-th second driving unit and the second clock signal XCK2 received by the first clock end of the (j+1)-th second driving unit. Similarly, the effective pulse time of the third clock signal XCK1 received by the second clock end xck of the k-th first driving unit may need to simultaneously cover the fourth clock signal XCK2 received by the second clock end of the j-th second driving unit and the fourth clock signal CK2 received by the second clock end of the (j+1)-th second driving unit.

Exemplarily, taking the driving process of the k-th first driving unit in each level of the first driving unit 70 as an example, before the Ta1 stage, the input signal S1*k*−1 received by the signal input terminal in may be a non-enable level, such that even if the third clock signal XCK1 of the second clock terminal xck controls the input transistor M1 to turn on, the signal transmitted to the first node N1 always remains at a non-enable level, and the first output transistor M6 is in an off state. When the third clock signal XCK1 of the second clock terminal xck controls the reset control transistor M2 to turn on, the first level signal of the first level signal terminal vgl may be transmitted to the second node N2, such that the signal of the second node N2 is an enable level and the second output transistor M7 is controlled to turn on. Therefore, the second level signal of the second level signal terminal vgh may be transmitted to the signal output terminal out as the first scan signal S1*k* of the k-th first driving unit, that is, the first scan signal S1*k* may remain at a non-enable level.

After entering the Ta1 stage, the input signal S1*k*−1 received by the signal input terminal in may become the enable level, and the third clock signal XCK1 of the second clock terminal xck may be a valid pulse, such that the input transistor M1 may transmit the input signal S1*k*−1 to the first node N1, the signal of the first node N1 becomes the enable level, and the first output transistor M6 is turned on. The first clock signal CK1 of the first clock terminal ck may still be maintained at the non-enable level such that the signal output terminal out still maintains the non-enable level of outputting the first scan signal S1*k*.

After entering the Ta2 stage, the input signal S1*k*−1 received by the signal input terminal in may become a non-enable level again, the third clock signal XCK1 of the second clock terminal xck may be also a non-enable level, and the first clock signal CK1 of the first clock terminal ck may be an enable level, such that the signal of the first node N1 remains at an enable level, the signal of the second node N2 remains at a non-enable level, the first output transistor M6 remains on, the second output transistor M7 may be turned off, and the enable level of the first clock signal CK1 of the first clock terminal CK may be transmitted to the signal output terminal out through the first output transistor M6. Therefore, the signal output terminal out may output the enable level of the first scan signal S1*k*.

After entering the Ta3 stage, the input signal S1*k*−1 received by the signal input terminal in may continue to remain at the non-enable level, the third clock signal XCK1 of the second clock terminal xck may become a valid pulse, and the first clock signal CK1 of the first clock terminal ck may become a non-enable level, such that the first node N1 becomes a non-enable level again. Since the third clock signal XCK1 of the second clock terminal xck controls the reset control transistor M2 to turn on again, the first level signal may be transmitted to the second node N2, thereby controlling the second node N2 to be an enable level, the second output transistor M7 may be turned on, and the second level signal may be output as the first scan signal S1*k*. Therefore, the first scan signal S1*k* may become a non-enable level.

After the Ta3 stage, the input signal S1*k*−1 received by the signal input terminal in may continue to remain at the non-enable level, such that the signal of the first node N1 continues to remain at the non-enable level, and the first scan signal S1*k* output by the signal output terminal out continues to remain at the non-enable level.

Therefore, by controlling the effective pulse time of the first clock signal CK1 and the third clock signal XCK1 received by the first driving units 60 of each level, the enable level time of the first scan signal S1 output by the first driving units 60 of each level may be shifted in sequence, thereby realizing row-by-row scanning of each pixel row in the display panel.

The driving process of the first driving unit 60 is described above, and the driving process of the second driving unit 70 may be similar to the driving process of the first driving unit 60. For the details, the references may be made to the previous embodiments and will not be repeated here.

In one optional embodiment, as shown in FIG. 33, FIG. 34, FIG. 35, and FIG. 36 which is a driving timing diagram of another display panel, when the pixel rows include the first-type pixel rows and the second-type pixel rows, the non-enable level time of the first scan signal S1 transmitted by each first scan line 21 may cover the pre-writing stage of each pixel P in the first-type pixel rows. There may be at least one first scan line 21 transmitting the first scan signal S1 whose enable level time covers the pre-writing stage of each pixel P in the second-type pixel row. The first scan line 21 electrically connected to the first-type pixel row may be a first-type first scan signal line, and the first scan line 21 electrically connected to the second-type pixel row may be a second-type first scan signal line. Each first scan line 21 electrically connected to the first driving unit 60 at the same level may include a first-type first scan line and a second-type first scan line.

In one embodiment, in the first-type pixel rows, the pre-writing stage of each pixel P may be located before the start moment of the enable level of the first scan signal S1 received by the first-type pixel rows; and, in the second-type pixel rows, the pre-writing stage of each pixel P may be located within the enable level time of the first scan signal S1 received by the second-type pixel rows.

Exemplarily, when the j-th pixel row 10*j* is the first-type pixel row 10*j* and the (j+1)-th pixel row 10*j*+1 is the second-type pixel row 10*j*+1, each pixel P in the j-th pixel row 10*j* and the (j+1)-th pixel row 10*j*+1 may receive the same first scan signal S1*k*, each pixel P in the j-th pixel row 10*j* may receive the second scan signal S2*j*, and each pixel P in the (j+1)-th pixel row 10*j*+1 may receive the second scan signal S2*j*+1. The first scan line 21 electrically connected to each pixel P in the j-th pixel row 10*j* may be the first-type first scan line, and the first scan line 21 electrically connected to each pixel P in the (j+1)-th pixel row 10*j*+1 may be the second-type first scan line. Therefore, during the non-enable level time of the first scan signal S1 between the enable level time of the first scan signal S1*k*−1 output by the (k−1)-th first driving unit 6*k*−1 and the enable level time of the first scan signal S1*k* output by the k-th first driving unit 6*k*, the pre-writing stages (T11*j*, T12*j*, T13*j*, T14*j*, T15*j*, T16*j*) of each pixel P in the j-th pixel row 10*j* may be performed in sequence to write the data signals of each pixel P in the j-th pixel row 10*j* to the corresponding data lines 11 respectively. After the first scan signal S1*k* output by the k-th first driving unit 6*k* becomes the enable level, the data writing stage T2*j* of each pixel P in the j-th pixel row 10*j* may be performed first, such that the data signals of each data line 11 may be correspondingly written into each pixel P in the j-th pixel row 10*j*. After the data writing stage T2*j* of each pixel P in the j-th pixel row 10*j*, the data writing stage T2*j* of the (j+1)-th pixel row 10*j* may be entered. The pre-writing stage (T11*j*+1, T12*j*+1, T13*j*+1, T14*j*+1, T15*j*+1, T16*j*+1) of each pixel P in the pixel row 10*j*+1 may be to write the data signal of each pixel P in the (j+1)-th pixel row 10*j*+1 to the corresponding data line 11; the pre-writing stage (T11*j*+1, T12*j*+1, T13*j*+1, T14*j*+1, T15*j*+1, T16*j*+1) of each pixel P in the (j+1)-th pixel row 10*j*+1 may be to write the data signal of each pixel P in the (j+1)-th pixel row 10*j*+1 to the corresponding data line 11. After the data writing stage T2*j*+1 of each pixel P in the (j+1)-th pixel row 10*j*+1, the data signals on each data line 11 may be correspondingly written into each pixel P in the (j+1)-th pixel row 10*j*+1. After the data writing stage T2*j*+1 of each pixel P in the (j+1)-th pixel row 10*j*+1, the first scan signal S1*k* output by the k-th first driving unit 6*k* may be turned into a non-enabled level. In this way, on the premise that each level of the first driving unit 60 drives at least two pixel rows, it may be ensured that the data signal of each pixel may be accurately written. Also, the coupling amount of the first scan signal S1 jump-coupled to the data signal of each pixel P in the same pixel row may remain consistent, such that the vertical stripes displayed may be improved or eliminated, and the display effect of the display panel 100 may be improved.

Figure 36:
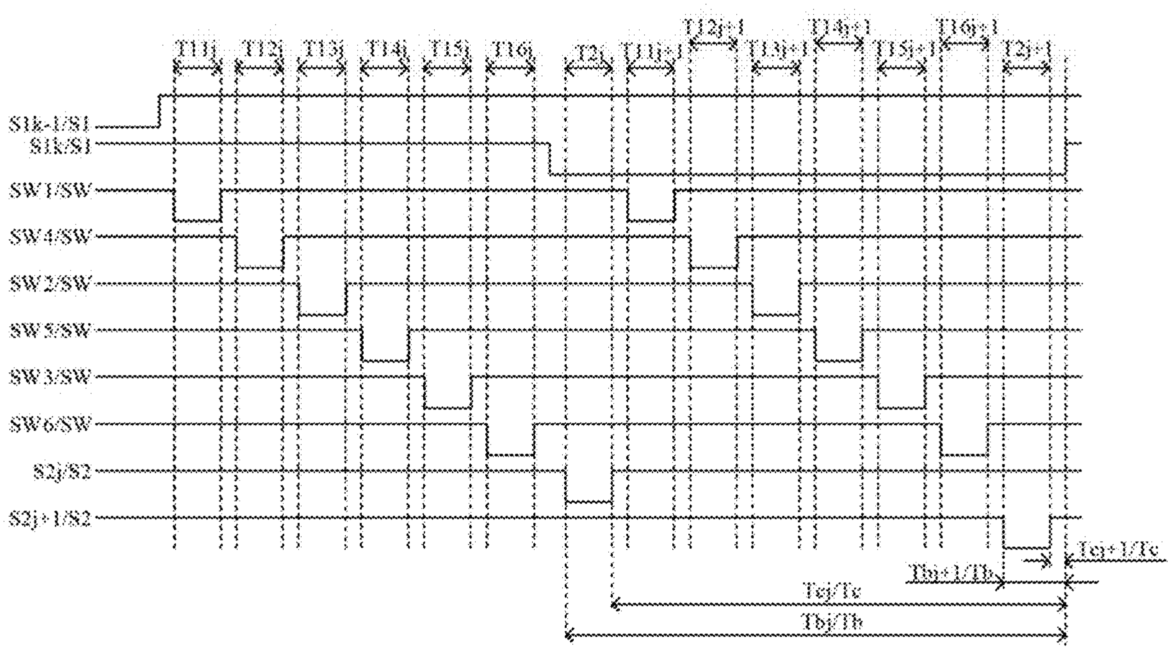
FIG. 36 illustrates a driving timing diagram of another display panel consistent with various disclosed embodiments in the present disclosure.

Optionally, on the basis of the above embodiments, as shown in FIG. 33 and FIG. 36, in one embodiment, the time period between the start moment of the enable level of the second scan signal S2 received by the same pixel P and the end moment of the enable level of the first scan signal S1 may be a first time period Tb. When the pixel row includes first-type pixel rows and second-type pixel rows, the first time period Tb of each pixel P in the first-type pixel row may be different from the first time period Tb of each pixel P in the second-type pixel row.

When the pre-writing stage of each pixel P in the first-type pixel row is within the non-enable level time of the first scan signal S1 transmitted by each first scan line 21, the signal written to each pixel P in the data writing stage of each pixel P in the first-type pixel row may be the sum of the data signal written in the pre-writing stage of the pixel P and the coupling signal when the first scan signal S1 jumps, such that the voltage of the data signal actually written to each pixel P is larger than or less than the required voltage of the data signal. Since the pre-writing stage of each pixel P in the second-type pixel row overlaps with the enable level time of the first scan signal S1 received by the second-type pixel row P, the pre-writing stage of each pixel P in the second-type pixel row may not be carried out until the first scan signal S1 jumps, and after the pre-writing stage, the data writing stage of each pixel P in the second-type pixel row may be directly entered, such that the data signal written to each pixel P in the second-type pixel row is a signal that has not been coupled to the jump of the first scan signal S1. Therefore, there may be a difference between the variation of the data signal written to each pixel P in the first-type pixel row and the variation of the data signal written to each pixel P in the second-type pixel row, such that the display luminous brightness of each pixel P in the first-type pixel row and the display luminous brightness of each pixel P in the second-type pixel row are different, thereby affecting the display uniformity of the display panel 100.

It can also be understood that the first time period Tb of the pixel P is the time for providing the data signal to the gate of its driving transistor. Generally, the longer the time for providing the data signal to the gate of the driving transistor, the closer the gate signal of the driving transistor of the pixel P is to the data signal provided thereto, such that the signal written to the gate of the driving transistor of the pixel P is more accurate.

In this embodiment, the first time period Tb of each pixel P in the first-type pixel row may be different from the first time period Tb of each pixel P in the second-type pixel row, for example, the first time period Tbj of each pixel P in the j-th pixel row 10*j* is different from the first time period Tbj+1 of each pixel P in the (j+1)-th pixel row 10*j*+1. Taking the non-enable level of the first scan signal S1*k* as a high level, the enable level as a low level, and the driving transistor in the pixel circuit as a PMOS transistor as an example, after the jump value of the first scan signal S1*k* is coupled to the data signal of each pixel P in the j-th pixel row 10*j*, the actual display luminescence brightness of each pixel P in the j-th pixel row 10*j* may be larger than the brightness when it is displayed and luminous according to the data signal provided to the corresponding data line 11 in the pre-writing stage. Therefore, by making the first time period Tbj of each pixel P in the j-th pixel row 10*j* different from the first time period Tbj+1 of each pixel P in the (j+1)-th pixel row 10*j*+1, for example, the duration of the first time period Tbj of each pixel P in the j-th pixel row 10*j* is longer than the duration of the first time period Tbj+1 of each pixel P in the (j+1)-th pixel row 10*j*+1, the display luminescence brightness of each pixel P in the j-th pixel row 10*j* and each pixel P in the (j+1)-th pixel row 10*j*+1 may be balanced, thereby improving the display uniformity of the display panel.

Since the enable level time of the first scan signal S1 received by the same pixel P covers the enable level time of its second scan signal S2, the enable level time of the pixel P receiving the second scan signal S2 may be the data writing stage T2 of the pixel P. When the time period between the termination moment of the enable level of the second scan signal S2 received by the same pixel P and the termination moment of the enable level of the first scan signal S1 is the data holding stage Tc, the duration of the first time period Tb of the pixel P may be the sum of the duration of the data writing stage T2 of the pixel P and the duration of the data holding stage Tc. When the duration of the first time period Tb of each pixel P in the first-type pixel row is different from the duration of the first time period of each pixel P in the second-type pixel row, the data writing stage T2 of each pixel P in the first-type pixel row and the data writing stage T2 of each pixel P in the second-type pixel row may have different durations, and/or the duration of the data holding stage Tc of each pixel P in the first-type pixel row may be different from the duration of the data holding stage Tc of each pixel P in the second-type pixel row. Under the premise that the display luminous brightness of each pixel P in the first-type pixel row and each pixel in the second-type pixel row P are balanced, the embodiments of the present disclosure do not make any specific limitation to this.

In one optional embodiment, as shown in FIG. 33 and FIG. 36, when the pixel rows include first-type pixel rows and second-type pixel rows, if the duration of the data holding stage Tc of each pixel P in the first-type pixel row is different from the duration of the data holding stage Tc of each pixel P in the second-type pixel row, the duration of the data writing stage T2 of each pixel P in the first-type pixel row may be the same as the duration of the data writing stage T2 of each pixel P in the second-type pixel row.

Exemplarily, taking the j-th pixel row 10*j* as the first-type pixel row and the (j+1)-th pixel row 10*j*+1 as the second-type pixel row as an example, the duration of the data writing stage T2*j* of each pixel P in the j-th pixel row 10*j* may be the same as the duration of the data writing stage T2*j*+1 of each pixel P in the (j+1)-th pixel row 10*j*+1, such that the enable level time of the second scan signal S2*j* received by each pixel P in the j-th pixel row 10*j* is the same as the enable level time of the second scan signal S2*j*+1 received by each pixel P in the (j+1)-th pixel row 10*j*+1. Therefore, the second scan signal S2 output by the second driving unit 70 of each level in the second driving circuit 7 may be shifted sequentially without changing the enable level time of the second scan signal S2 output by the second driving unit 70 of each level, which is beneficial to simplify the control logic of the second driving circuit 7 and reduce the driving cost of the display panel.

The duration of the data holding stage Tej of each pixel P in the j-th pixel row 10*j* may be different from the duration of the data holding stage Tcj+1 of each pixel P in the (j+1)-th pixel row 10*j*+1, such that after the data signal is written into each pixel P in the j-th pixel row 10*j*, the compensation module in each pixel P in the j-th pixel row 10*j* may be kept in the on state continuously. Therefore, there may be a longer turn-on time between the first electrode and the gate of the driving transistor in the pixel P of the j-th pixel row 10*j*, such that the first electrode signal and the gate signal of the driving transistor in the pixel P of the j-th pixel row 10*j* may be kept consistent for a long time, to fully adjust the hysteresis phenomenon of the driving transistor in the pixel P of the j-th pixel row 10*j*. For each pixel P in the (j+1)-th pixel row 10*j*+1, the duration of the data holding stage Tcj+1 may be shorter, such that the conduction time between the gate and the first electrode of the driving transistor in the pixel P of the (j+1)-th pixel row 10*j*+1 may be shorter. Therefore, according to the difference in data signals written between each pixel P in the j-th pixel row 10*j* and each pixel P in the (j+1)-th pixel row 10*j*+1, the duration of the data holding stage Tc of each pixel P in the j-th pixel row 10*j* and each pixel P in the (j+1)-th pixel row 10*j*+1 may be set accordingly, such that when entering the light emitting stage of each pixel P in the j-th pixel row 10*j* and each pixel P in the (j+1)-th pixel row 10*j*+1, the display light emitting brightness of each pixel P in the j-th pixel row 10*j* and each pixel P in the (j+1)-th pixel row 10*j*+1 may be balanced, thereby improving the display uniformity of the display panel 100.

Figure 37:
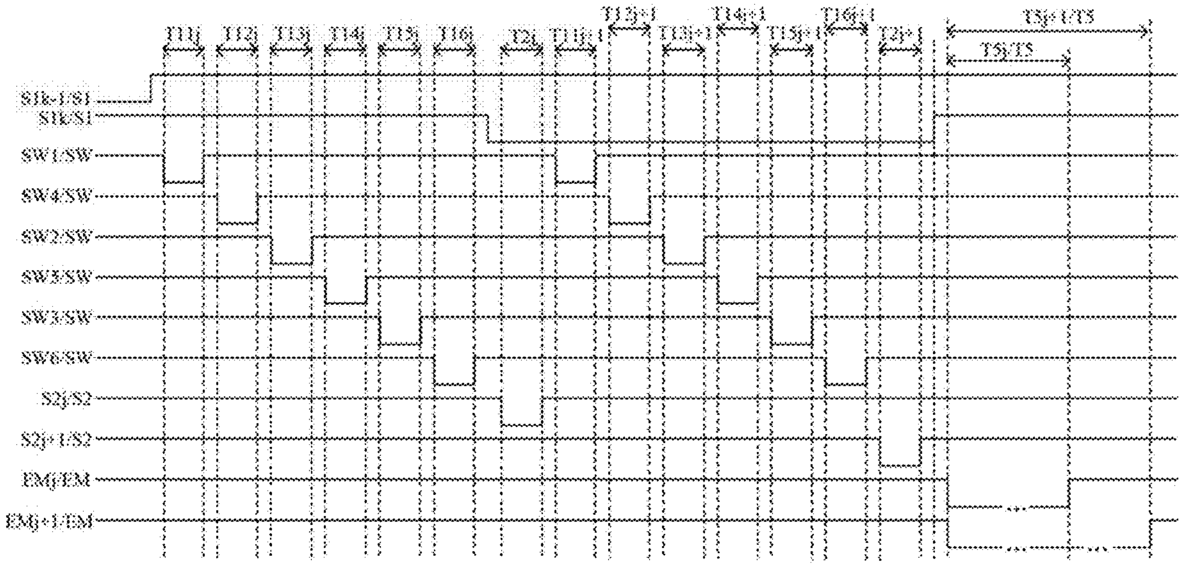
FIG. 37 illustrates a driving timing diagram of another display panel consistent with various disclosed embodiments in the present disclosure.

Optionally, in one embodiment, as shown in FIG. 33 and FIG. 37 which is a driving timing diagram of another display panel, the driving cycle of the pixel P may also include a light-emitting stage T5. In the light-emitting stage T5, the pixel P may display and emit light according to the written data signal. The duration of the light-emitting stage T5 in the first-type pixel row may be different from the duration of the light-emitting stage T5 in the second-type pixel row.

It can be understood that the display luminous brightness of the pixel P observed by the human eye is the integral of the display grayscale of the pixel P over time. Thus, when the display grayscale is constant, the longer the display luminous time of the pixel P, the higher the display luminous brightness of the pixel P observed by the human eye, that is, the higher the overall display luminous brightness of the pixel P.

Since the coupling amount of the first scan signal S1*k* to the data signal of each pixel P in the first-type pixel row (j-th pixel row 10*j*) and the data signal of each pixel P in the second-type pixel row ((j+1)-th pixel row 10*j*+1) is different, when the light-emitting time of each pixel P in the first-type pixel row (j-th pixel row 10*j*) and each pixel P in the second-type pixel row ((j+1)-th pixel row 10*j*+1) is the same, there may be a difference in the light-emitting brightness displayed by each pixel P in the first-type pixel row (j-th pixel row 10*j*) and each pixel P in the second-type pixel row ((j+1)-th pixel row 10*j*+1). By making each pixel P in the first-type pixel row (j-th pixel row 10*j*) and each pixel P in the second-type pixel row ((j+1)-th pixel row 10*j*+1) have different light-emitting time, each pixel P may have a different display luminous duration, that is, the duration of the luminous stage of each pixel P in the first-type pixel row (j-th pixel row 10*j*) may be different from the duration of the luminous stage of each pixel P in the second-type pixel row ((j+1)-th pixel row 10*j*+1). For example, when the duration of the luminous stage of each pixel P in the first-type pixel row (j-th pixel row 10*j*) is less than the duration of the luminous stage of each pixel P in the second-type pixel row ((j+1)-th pixel row 10*j*+1), the display luminous brightness of each pixel P in the first-type pixel row (j-th pixel row 10*j*) and each pixel P in the second-type pixel row ((j+1)-th pixel row 10*j*+1) may be balanced, which is beneficial to improving the display uniformity of the display panel.

Figure 38:
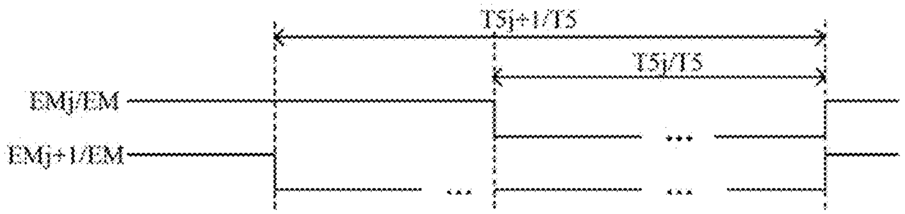
FIG. 38 illustrates a driving timing diagram of another display panel consistent with various disclosed embodiments in the present disclosure.

FIG. 37 only exemplifies that the moment when each pixel P in the first-type pixel row (j-th pixel row 10*j*) enters the light-emitting stage T5*j* may be the same moment as the moment when each pixel P in the second-type pixel row ((j+1)-th pixel row 10*j*+1) enters the light-emitting stage T5*j*+1. In another embodiment, as shown in FIG. 38, the moment when each pixel P in the first-type pixel row (j-th pixel row 10*j*) enters the light-emitting stage T5*j* may be different from the moment when each pixel P in the second-type pixel row ((j+1)-th pixel row 10*j*+1) enters the light-emitting stage T5*j*+1. Under the premise of being able to balance the display luminous brightness of each pixel P in the first-type pixel row (j-th pixel row 10*j*) and each pixel P in the second-type pixel row ((j+1)-th pixel row 10*j*+1), the embodiments of the present disclosure do not make any specific limitation on this.

Figure 39:
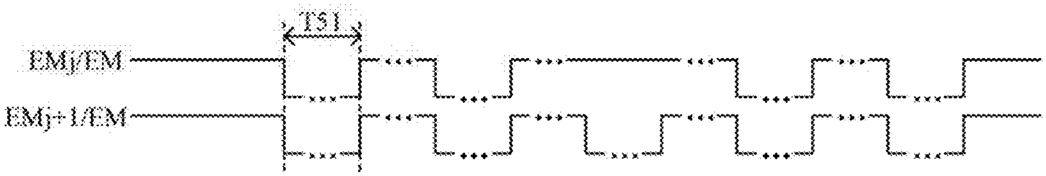
FIG. 39 illustrates a driving timing diagram of another display panel consistent with various disclosed embodiments in the present disclosure.
Figure 40:
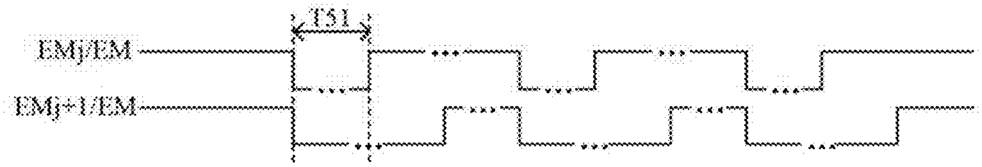
FIG. 40 illustrates a driving timing diagram of another display panel consistent with various disclosed embodiments in the present disclosure.

FIG. 37 and FIG. 38 only show by way of example that in a display frame, after entering the light-emitting stage T5 of the pixel P, the pixel P may continuously display and emit light. In some other embodiment, in a display frame, the display light-emitting time of the pixel P may be discontinuous. For example, the display frame may include multiple light-emitting sub-stages, and the total duration of the light-emitting sub-stages in the same display frame may be the duration of the light-emitting stage of the pixel P in the display frame. At this time, the duration of the light-emitting stage of each pixel P in the first-type pixel row (j-th pixel row 10*j*) may be different from the duration of the light-emitting stage of each pixel P in the second-type pixel row ((j+1)-th pixel row 10*j*+1). It can be understood that, as shown in FIG. 39, the number of light-emitting sub-stages T51 of each pixel P in the first-type pixel row (j-th pixel row 10*j*) may be different from the number of light-emitting sub-stages T51 of each pixel P in the second-type pixel row ((j+1)-th pixel row 10*j*+1), or, as shown in FIG. 40, the duration of the light-emitting sub-stages T51*j* of each pixel P in the first-type pixel row (j-th pixel row 10*j*) may be different from the duration of the light-emitting sub-stages T51*j* of each pixel P in the second-type pixel row ((j+1)-th pixel row 10*j*+1). Under the premise of being able to balance the display luminous brightness of each pixel P in the first-type pixel row (j-th pixel row 10*j*) and each pixel P in the second-type pixel row ((j+1)-th pixel row 10*j*+1), the embodiments of the present disclosure do not make any specific limitation on this.

The present disclosure also provides a display device. The display device may include any display panel provided by various embodiments of the present disclosure. The display device may also have the beneficial effects of the display panel in the above embodiments. The similarities may be understood by referring to the above explanation of the display panel, and will not be repeated below.

Figure 41:
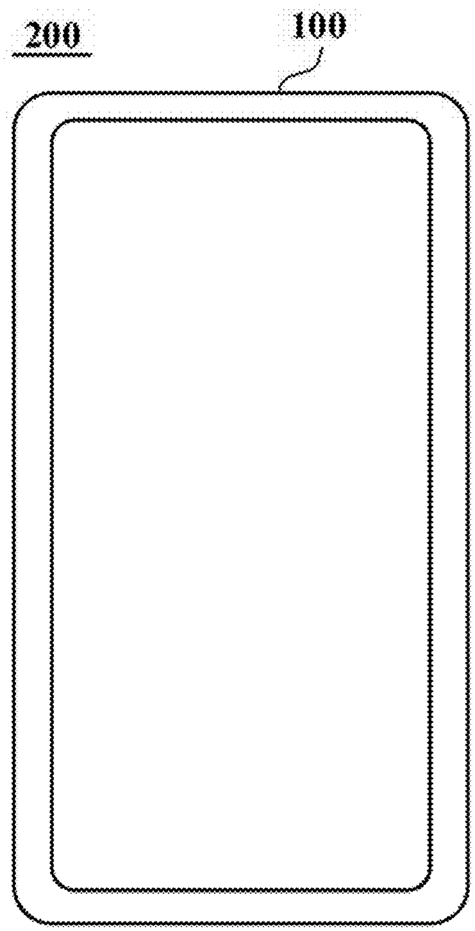
FIG. 41 illustrates an exemplary display device consistent with various disclosed embodiments in the present disclosure.

In one embodiment shown in FIG. 41, the display device 200 may include any display panel 100 provided by various embodiments of the present disclosure. The display device may be any electronic product with a display function, including but not limited to: cell phones, televisions, laptops, desktop computers, desktop displays, tablet computers, digital cameras, smart bracelets, smart glasses, vehicle displays, industrial control equipment, medical display screens, touch interactive terminals, etc., and the embodiments of the present disclosure do not specifically limit this.

In the present disclosure, relational terms such as "first" and "second" are only used to distinguish one entity or operation from another entity or operation, and do not necessarily require or imply that there is a relationship between these entities or operations. There is no such actual relationship or sequence. Furthermore, the terms "comprises", "include", or any other variations thereof are intended to cover a non-exclusive inclusion such that a process, method, article, or apparatus that includes a list of elements includes not only those elements, but also those not expressly listed, or elements inherent to the process, method, article or equipment. Without further limitation, an element defined by the statement "comprises a . . . " does not exclude the presence of additional identical elements in a process, method, article, or apparatus that includes the stated element.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A display panel, comprising a plurality of pixels arranged in an array, a plurality of data lines, and a plurality of first scan lines, wherein:

at least a portion of pixels of the plurality of pixels in a same row is electrically connected to a same first scan line of the plurality of first scan lines;

at least a portion of pixels of the plurality of pixels in a same column is electrically connected to a same data line of the plurality of data lines;

the plurality of pixels at least includes first pixels whose luminous color is a first color;

a driving cycle of one pixel of the plurality of pixels includes a pre-writing stage and a data writing stage;

in the pre-writing stage of the pixel, a data signal of the pixel is controlled to be written to a data line electrically connected to the pixel;

in the data writing stage of the pixel, a data signal on the data line electrically connected to the pixel is controlled to be written to the pixel;

at least in the data writing stage of the pixel, the first scan line electrically connected to the pixel transmits an enable level of a first scan signal;

a display mode of the display panel includes a first mode; and in the first mode, there is at least one first scan line whose enable level time covers the pre-writing stage of a first pixel of the first pixels in at least part of the pixel rows, or a non-enable level time of the first scan signal transmitted by a first scan line of the first scan lines covers the pre-writing stage of a first pixel of the first pixels in at least part of the pixel rows.

2. The display panel according to claim 1, further including a plurality of data terminals and a plurality of multiplexer circuits, wherein:

one multiplexer circuit of the plurality of multiplexer circuits includes a plurality of switch modules;

a control terminal of each of the plurality of switch modules in the same multiplexer circuit receives a different switch control signal, and switch control signals control each of the plurality of switch modules in the same multiplexer circuit to be turned on in a time-sharing manner;

an input terminal of each of the plurality of switch modules in the same multiplexer circuit is electrically connected to one same data terminal of the plurality of data terminals, and an output terminal of each switch module is electrically connected to one corresponding data line respectively; and in the pre-writing stage of one pixel electrically connected to a data line corresponding to one switch module, the switch control signal received by the switch module is an enable level.

3. The display panel according to claim 2, wherein:

the plurality of pixels also includes second pixels whose luminous color is a second color;

luminous efficiency of the first pixels is different from luminous efficiency of the second pixels; and a duration of the enable level of the switch control signals received by the switch modules electrically connected to the first pixels is a first duration, a duration of the enable level of the switch control signals received by the switch modules electrically connected to the second pixels is a second duration, and the first duration is different from the second duration.

4. The display panel according to claim 1, wherein:

the plurality of pixels also includes second pixels whose luminous color is a second color, wherein the first color is different from the second color;

the second pixels include first-type second pixels and second-type second pixels;

the pixel rows include at least one first pixel row; and in the at least one first pixel row, the pre-writing stage of the first-type second pixels overlaps with the non-enable level time of the first scan signal, and the pre-writing stage of the second-type second pixels overlaps with the enable level time of the first scan signal.

5. The display panel according to claim 4, wherein:

the first color is green, and the second color includes at least one of red or blue.

6. The display panel according to claim 1, wherein:

the plurality of pixels also includes second pixels whose luminous color is a second color; and in the pixels located in the same row, when there is at least one first scan line whose enable level of the first scan signal covers the pre-writing stage of the first pixels, the non-enable level of the first scan signal transmitted by each first scan line covers the pre-writing stage of the second pixels; or, in the pixels located in the same row, when the non-enable level of the first scan signal transmitted by each first scan line covers the pre-writing stage of the first pixels, there is at least one first scan line whose enable level of the first scan signal covers the pre-writing stage of the second pixels.

7. The display panel according to claim 1, further including a plurality of second scan lines, wherein:

one pixel of the plurality of pixels includes a compensation module, a data writing module, a driving module, and a light-emitting element;

the driving module includes a driving transistor;

the data writing module is used to control the data signal on one corresponding data line to be written to the driving module in the data writing stage;

the compensation module is used to compensate a threshold voltage of the driving transistor to the driving module at least in the data writing stage;

the driving module is used to selectively provide a driving current to the light-emitting element;

the compensation module of each pixel in one same pixel row is electrically connected to a same first scan line, and the data writing module of each pixel in one same pixel row is electrically connected to one same second scan line;

the first scan signal is used to control the compensation module to be turned on or off, and the second scan signal transmitted by the second scan line is used to control the data writing module to be turned on or off; and the enable level time of the first scan signal received by the same pixel covers the enable level time of the second scan signal.

8. The display panel according to claim 7, wherein:

the pixel rows include first-type pixel rows and/or second-type pixel rows;

the non-enable level time of the first scan signal transmitted by each first scan line covers a pre-writing stage of each of the pixels in the first-type pixel rows; and the enable level time of the first scan signal transmitted by at least one first scan line covers a pre-writing stage of each of the pixels in the second-type pixel rows.

9. The display panel according to claim 8, wherein:

a time period between a start moment of the enable level of the second scan signal and an end moment of the enable level of the first scan signal received by one same pixel is the first time period; and when the pixel rows include the first-type pixel rows and the second-type pixel rows, the first time period of each pixel in the first-type pixel rows is different from the first time period of each pixel in the second-type pixel rows.

10. The display panel according to claim 8, wherein:

a time period between the end moment of the enable level of the second scan signal and the end moment of the enable level of the first scan signal received by one same pixel is a data holding stage; and when the pixel rows include the first-type pixel rows and the second-type pixel rows, the data holding stage of each pixel in the first-type pixel rows is different from the data holding stage of each pixel in the second-type pixel rows.

11. The display panel according to claim 8, wherein:

the driving cycle of the pixel also includes a light-emitting stage;

in the light-emitting stage, the pixel displays and emits light according to the written data signal; and the duration of the light-emitting stage in the first-type pixel rows is different from the duration of the light-emitting stage in the second-type pixel rows.

12. The display panel according to claim 7, wherein:

a display time of a frame of the display panel includes a refresh frame;

the pre-writing stage and the data writing stage are both located within the refresh frame;

the driving cycle of the pixel also includes at least one bias adjustment stage;

the data writing module is also used to control the bias adjustment signal to be written to the driving module during the bias adjustment stage;

in the first mode, the display time of one frame of the display panel also includes at least one holding frame; and the bias adjustment stage includes a first bias adjustment stage, wherein the first bias adjustment stage is located in the holding frame.

13. The display panel according to claim 7, further including a first driving circuit and a second driving circuit, wherein:

the first driving circuit includes a plurality of cascaded first driving units, wherein one first driving unit of each level sequentially outputs the enable level of the first scan signal and the first driving unit of each level is electrically connected to at least two adjacent first scan lines; and the second driving circuit includes a plurality of cascaded second driving units, wherein one second driving unit of each level sequentially outputs the enable level of the second scan signal and the second driving unit of each level is electrically connected to each second scan line respectively.

14. The display panel according to claim 13, wherein:

the pixel rows include first-type pixel rows and second-type pixel rows;

the non-enable level time of the first scan signal transmitted by each of the first scan lines covers the pre-writing stage of each of the pixels in the first-type pixel rows;

there is at least one first scan line transmitting the first scan signal whose enable level time covers the pre-writing stage of each of the pixels in the second-type pixel rows;

the first scan lines electrically connected to the first-type pixel rows are first-type first scan signal lines, and the first scan lines electrically connected to the second-type pixel rows are second-type first scan signal lines; and each of the first scan lines electrically connected to the first driving unit at the same level includes the first-type first scan line and the second-type first scan line.

15. The display panel according to claim 14, wherein:

in the first-type pixel rows, the pre-writing stage of each pixel is located before the start time of the enable level of the first scan signal received by the first-type pixel rows; and in the second-type pixel rows, the pre-writing stage of each pixel is located within the enable level time of the first scan signal received by the second-type pixel rows.

16. The display panel according to claim 13, wherein:

one first driving unit and one second driving unit have the same structure;

the first driving unit and the second driving unit both include a first clock end;

the first clock end of the first driving unit receives a first clock signal, and the first clock end of the second driving unit receives a second clock signal; and the effective pulse width of the first clock signal is larger than the effective pulse width of the second clock signal.

17. A display panel, comprising a plurality of pixels arranged in an array, a plurality of data lines, and a plurality of first scan lines, wherein:

at least a portion of pixels of the plurality of pixels in a same row is electrically connected to a same first scan line of the plurality of first scan lines;

at least a portion of pixels of the plurality of pixels in a same column is electrically connected to a same data line of the plurality of data lines;

the plurality of pixels at least includes first pixels whose luminous color is a first color;

a driving cycle of one pixel of the plurality of pixels includes a pre-writing stage and a data writing stage;

in the pre-writing stage of the pixel, a data signal of the pixel is controlled to be written to a data line electrically connected to the pixel;

in the data writing stage of the pixel, a data signal on the data line electrically connected to the pixel is controlled to be written to the pixel;

at least in the data writing stage of the pixel, the first scan line electrically connected to the pixel transmits an enable level of a first scan signal;

a display mode of the display panel includes a first mode;

in the first mode, there is at least one first scan line whose enable level time covers the pre-writing stage of a first pixel of the first pixels in at least part of the pixel rows, or a non-enable level time of the first scan signal transmitted by a first scan line of the first scan lines covers the pre-writing stage of a first pixel of the first pixels in at least part of the pixel rows;

the plurality of pixels includes first-type pixels and second-type pixels;

the pre-writing stage of the first-type pixels does not overlap with the data writing stage of the first-type pixels; and the pre-writing stage of the second-type pixels overlaps with the data writing stage of the second-type pixels.

18. The display panel according to claim 17, wherein:

all first pixels in one same pixel row are first-type pixels or second-type pixels.

19. The display panel according to claim 17, wherein:

the plurality of pixels also includes second pixels whose luminous color is a second color, wherein the first color is different from the second color;

at least a portion of the pixel rows are second pixel rows; and in second pixels located in one second pixel row, a portion of the second pixels is the first-type pixels, and another portion of the second pixels is the second-type pixels.

20. A display device comprising a display panel, wherein:

the display panel includes a plurality of pixels arranged in an array, a plurality of data lines, and a plurality of first scan lines;

at least a portion of pixels of the plurality of pixels in a same row is electrically connected to a same first scan line of the plurality of first scan lines;

at least a portion of pixels of the plurality of pixels in a same column is electrically connected to a same data line of the plurality of data lines;

the plurality of pixels at least includes first pixels whose luminous color is a first color;

a driving cycle of a pixel of the plurality of pixels includes a pre-writing stage and a data writing stage;

in the pre-writing stage of the pixel, a data signal of the pixel is controlled to be written to a data line electrically connected to the pixel;

in the data writing stage of the pixel, a data signal on the data line electrically connected to the pixel is controlled to be written to the pixel;

at least in the data writing stage of the pixel, the first scan line electrically connected to the pixel transmits an enable level of a first scan signal;

a display mode of the display panel includes a first mode; and in the first mode, there is at least one first scan line whose enable level time covers the pre-writing stage of a first pixel of the first pixels in at least part of the pixel rows, or a non-enable level time of the first scan signal transmitted by a first scan line of the first scan lines covers the pre-writing stage of a first pixel of the first pixels in at least part of the pixel rows.

* * * * *